US007486966B2

(12) United States Patent
Sayers et al.

(10) Patent No.: US 7,486,966 B2
(45) Date of Patent: *Feb. 3, 2009

(54) METHOD AND APPARATUS FOR INTEGRATED WIRELESS COMMUNICATIONS IN PRIVATE AND PUBLIC NETWORK ENVIRONMENTS

(75) Inventors: Ian Leslie Sayers, Redwood City, CA (US); Paul Jan Long, San Francisco, CA (US); Sheausong Yang, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 10/962,790

(22) Filed: Oct. 12, 2004

(65) Prior Publication Data

US 2005/0059390 A1 Mar. 17, 2005

Related U.S. Application Data

(63) Continuation of application No. 10/395,323, filed on Mar. 21, 2003, now Pat. No. 6,807,431, which is a continuation of application No. 09/188,856, filed on Nov. 9, 1998, now Pat. No. 6,539,237.

(51) Int. Cl.
H04M 1/00 (2006.01)
(52) U.S. Cl. .................... 455/555; 455/461; 455/554.1; 455/554.2
(58) Field of Classification Search ................ 455/555, 455/461, 554.1, 554.2, 426.2, 435.1, 436, 455/455, 422.1
See application file for complete search history.

(56) References Cited

U.S. PATENT DOCUMENTS 5,602,843 A 2/1997 Gray (Continued)

FOREIGN PATENT DOCUMENTS

EP 0 766 427 A2 2/1997

OTHER PUBLICATIONS

Harry Newton, 1998, Newton's Telecom Dictionary, pp. 261, 262, 335, 403, 731, 732, 825.

(Continued)

*Primary Examiner*—Barry W Taylor
(74) *Attorney, Agent, or Firm*—Hamilton, Brook, Smith & Reynolds, P.C.

(57) ABSTRACT

A communication system formed by a private network that includes a private wireless network. The communication system includes a public wireless network using a public wireless protocol, such as GSM, and includes public networks, such as PSTN, ISDN and the Internet, using a wired protocol, such as 1P. The private network also includes a local area network (LAN) and the private network connects to the public networks using a wired packet protocol, such as IP. The public and private wireless networks operate with the same public wireless protocol, such as GSM, and the private wireless network additionally operates with a wired packet protocol, such as IP. The communication system permits users to operate freely in both public and private wireless networks using standard mobile stations while achieving high private network data rates. The communication system uses normal wireless handsets or other mobile or fixed stations without need for any modifications.

20 Claims, 12 Drawing Sheets

U.S. PATENT DOCUMENTS

| | | | |
|---|---|---|---|
| 5,796,729 A | | 8/1998 | Greaney et al. |
| 5,822,309 A | | 10/1998 | Ayanoglu et al. |
| 5,970,059 A | * | 10/1999 | Ahopelto et al. ............ 370/338 |
| 5,978,386 A | * | 11/1999 | Hamalainen et al. ........ 370/466 |
| 5,978,672 A | | 11/1999 | Hartmaier et al. |
| 5,999,813 A | | 12/1999 | Lu et al. |
| 6,296,820 B1 | | 5/2002 | Dolan et al. |
| 6,415,151 B1 | | 7/2002 | Kreppel |
| 6,539,237 B1 | | 3/2003 | Sayers et al. |

OTHER PUBLICATIONS

"Digital Cellular Telecommunications System (Phase 2+)" General Packet Radio Service, service description, Stage 2, GSM, ETSI, 2000.

* cited by examiner

METHOD AND APPARATUS FOR INTEGRATED WIRELESS COMMUNICATIONS IN PRIVATE AND PUBLIC NETWORK ENVIRONMENTS

RELATED APPLICATION

This application is a continuation of U.S. application Ser. No. 10/395,323, filed Mar. 21, 2003, now U.S. Pat. No. 6,807, 431, which is a continuation of U.S. application Ser. No. 09/188,856, filed Nov. 9, 1998 now U.S. Pat. No. 6,539,237. The entire teachings of the foregoing applications are incorporated herein by reference.

BACKGROUND OF THE INVENTION

The present invention is a method and apparatus that provides for wireless calls in private network environments and in public network environments. More particularly, this invention relates to communication systems that interconnect wireless networks with private networks where the private networks typically are corporate networks that connect to public networks such as PSTN, ISDN and the Internet.

Conventional Cellular Systems

Present day cellular mobile telephone systems provide for a large and increasing demand for mobile services. Cellular systems "reuse" frequency within a group of cells to provide wireless two-way radio frequency (RF) communication to large numbers of users. Each cell covers a small geographic area and collectively a group of adjacent cells covers a larger geographic region. Each cell has a fraction of the total amount of RF spectrum available to support cellular users. Cells are of different sizes (for example, macro-cell or micro-cell) and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) though telephone switches that are adapted for mobile communication. The switches provide for the hand-off of users from cell to cell and thus typically from frequency to frequency as mobile users move between cells In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell.

The forward and reverse channel communications use separate frequency bands so that simultaneous transmissions in both directions are possible. This operation is referred to as frequency division duplex (FDD) signaling. In time division duplex (TDD) signaling, the forward and reverse channels take turns using the same frequency band.

The base station in addition to providing RF connectivity to users also provides connectivity to a Mobile Services Switching Center (MSC). In a typical cellular system, one or more MSC will be used over the covered region. Each MSC can service a number of base stations and associated cells in the cellular system and supports switching operations for routing calls between other systems (such as the PSTN) and the cellular system or for routing calls within the cellular system.

Base stations are typically controlled from the MSC by means of a Base Station Controller (BSC). The BSC assigns RF carriers to support calls, coordinates the handoff of mobile users between base stations, and monitors and reports on the status of base stations. The number of base stations controlled by a single MSC depends upon the traffic at each base station, the cost of interconnection between the MSC and the base stations, the topology of the service area and other similar factors.

A handoff between base stations occurs, for example, when a mobile user travels from a first cell to an adjacent second cell. Handoffs also occur to relieve the load on a base station that has exhausted its traffic-carrying capacity or where poor quality communication is occurring. The handoff is a communication transfer for a particular user from the base station for the first cell to the base station for the second cell. During the handoff in conventional cellular systems, there may be a transfer period of time during which the forward and reverse communications to the mobile user are severed with the base station for the first cell and are not established with the second cell.

Conventional cellular implementations employ one of several techniques to reuse RF bandwidth from cell to cell over the cellular domain. The power received from a radio signal diminishes as the distance between transmitter and receiver increases. Conventional frequency reuse techniques rely upon power fading to implement reuse plans. In a frequency division multiple access (FDMA) system, a communications channel consists of an assigned particular frequency and bandwidth (carrier) for continuous transmission. If a carrier is in use in a given cell, it can only be reused in cells sufficiently separated from the given cell so that the reuse site signals do not significantly interfere with the carrier in the given cell. The determination of how far away reuse sites must be and of what constitutes significant interference are implementation-specific details. The cellular Advanced Mobile Phone System (AMPS) currently in use in the United States employs FDMA communications between base stations and mobile cellular telephones.

In time division multiple access (TDMA) systems, multiple channels are defined using the same carrier. The separate channels each transmit discontinuously in bursts which are timed so as not to interfere with the other channels on that carrier. Typically, TDMA implementations also employ FDMA techniques. Carriers are reused from cell to cell in an FDMA scheme, and on each carrier, several channels are defined using TDMA methods. The Global System for Mobile Communications (GSM) and PCS 1900 standards are examples of TDMA methods in current use.

The present specification uses a GSM system for purposes of explanation but the present invention applies to any wireless system protocol.

GSM Cellular Systems

The GSM system architecture is described, for example, in detail by M. Mouly and M.-B. Pautet, The GSM System for Mobile Communications, 1992 and Mouly and M.-B. Pautet, *GSM Protocol Architecture: Radio Sub-system Signaling*, IEEE 41 st Vehicular Technology Conference, 1991. The following sections highlight some unique aspects of GSM systems.

The development of GSM started in 1982, when the Conference of European Posts and Telegraphs (CEPT) formed a study group called Groupe Special Mobile. The main purpose of this group was to provide a single Digital Cellular standard in the 900 MHz band that could be used to unify the disparate analog standards across Europe. In 1989, the responsibility for GSM was transferred to the European Telecommunication Standards Institute (ETSI), and the Phase I GSM recommendations were published in 1990. At that time, the United Kingdom requested a specification based on GSM but for higher user densities with low-power mobile stations, and operating at 1.8 GHz. The specifications for this system, called Digital Cellular System (DCS 1800) were published 1991. Commercial operation of GSM networks started in mid-1991 in European countries.

The GSM system specifications incorporate many advanced services and features including:
ISDN compatibility based upon Q.931
World-wide roaming with other GSM networks
Two way messaging
Data Services
FAX Services
ISDN Supplementary Services.

However, the GSM system is designed fundamentally for use in a traditional Circuit Switched environment that uses 64 kbps voice and data transport.

GSM System Architecture

The standard GSM network includes three major components, namely, *the Mobile Station* (MS), *Base Station Sub-System* (BSS) and the *Network Sub-System* (NSS). The GSM Specifications define the network entities and their associated interfaces within the Public Land Mobile Network (PLMN). The complete suite of specifications also includes documents that define the type approval procedures for mobile stations allowing mobile stations to be used in different countries, independently of the country in which they were type approved.

Base Station Subsystem (BSS)

The Base Station Subsystem (BSS) is composed of two main parts, the Base Transceiver Station (BTS) and the Base Station Controller (BSC). The BTS includes the radio transceivers that define the radio cell boundary and handles the radio (Um) interface protocols with the mobile station. There are a number of different cell types, macro, micro and pico, that can be deployed dependent on the terrain, subscriber density and coverage requirements. The macro cell is intended for large cell sizes with ranges from 2 km to 70 km. The micro cell is intended to provide cell sizes from 100 m to 5 km, either as an in fill or in areas serving a high density of subscribers. The pico cells are intended to support cell sizes in the range 50 m to 1 km and will be used to provide high quality local radio coverage. The BTS supports all the required channel coding, encryption and speech coding required by the radio interface. The speech transcoding may be performed locally at the BTS or remotely at the BSC or MSC. If remote transcoding is used, then the BTS is still required to control this function.

The Base Station Controller (BSC) manages the radio resources of one or more BTSs across the Abis interface. The BSC controls most of the features of the radio network, including allocation of radio time slots to a mobile station, release of the resources, interpretation of measurement results and control of radio interface handovers. The BSC interfaces to the NSS via the A-interface to the MSC.

Radio Transmission

The BTS is responsible for maintaining the radio link with the GSM Mobile station. Currently the GSM system can support three frequency bands at 900, 1800 and 1900 MHz. However in each band the physical TDMA structure is identical. Each RF carrier is divided into eight time slots using TDMA. Groups of eight consecutive time slots form TDMA frames.

There are two types of logical channels that are sent over the physical radio interface and these are Traffic channels and Common Control Channels. The traffic channels provide a bi-directional point-to-point transmission link to a mobile station. Full-rate Traffic Channels (TCH/F) and half-rate Traffic Channels (TCH/H) are allocated together with a low bit-rate Slow Associated Control Channel (SACCH), which typically transmits measurements needed for handover decisions. There are also eighth-rate Traffic Channels, also called Stand-alone Dedicated Control Channels (SDCCH), which are used primarily for transmitting location updating information. In addition, a TCH slot can be pre-empted for signaling, in which case it is called a Fast Associated Control Channel (FACCH), which can be either full-rate or half-rate TCHs.

Common channels can be accessed both by idle mode mobiles, in order to change to dedicated mode, and by dedicated mode mobiles, to monitor surrounding base stations for handover information. The common channels, which are defined include:

Broadcast Control Channel (BCCH)
Continually broadcasts, on the downlink, information including base station identity, frequency allocations, and frequency-hopping sequences.
Frequency Correction Channel (FCCH) and Synchronization Channel (SCH)
Used to synchronize the mobile to the time slot structure of a cell by defining the beginning of a TDMA frame.
Random Access Channel (RACH)
Slotted Aloha channel used by the mobile to request access to the network.
Paging Channel (PCH)
Used to alert the mobile station of incoming call.
Access Grant Channel (AGCH)
Used to allocate an SDCCH to a mobile for signaling in order to obtain a dedicated channel), following a request on the RACH.

Speech and Channel Coding on the Radio Interface

Speech in GSM is digitally coded at a rate of 13 kbps, so-called full-rate speech coding. This rate is efficient compared with the standard ISDN rate of 64 kbps. In addition, GSM also supports a half-rate speech code operating at around 7 kbps, effectively doubling the capacity of a network.

This 13 kbps digital stream is split into (260 bits every 20 ms). This data contains some forward error correction raising the gross bit rate after channel coding to 22.8 kbps (or 456 bits every 20 ms). These 456 bits are divided into eight 57-bit blocks, and the result is interleaved amongst eight successive time slot bursts for protection against burst transmission errors.

Each time slot burst is 156.25 bits and contains two 57-bit blocks, and a 26-bit training sequence used for equalization. A burst is transmitted in 0.577 ms for a total bit rate of 270.8 kbps, and is modulated using Gaussian Minimum Shift Keying (GMSK) onto a 200 kHz carrier frequency. The 26-bit training sequence (TSC) is of a known pattern that is compared with the received pattern to perform a channel estimation. This channel estimation is then used to recover the received signal. Forward error control and equalization contribute to the robustness of GSM radio signals against interference and multipath fading.

Network Subsystem

An essential component of the Network Subsystem is the Mobile services Switching Center (MSC). The MSC provides the functions required to switch calls to/from the mobile user and the PSTN or ISDN fixed network. In addition the MSC also provides the functions needed to track and maintain communication with a mobile subscriber, these include registration, authentication, location updating, inter-MSC handovers, and call routing to a roaming subscriber. In order to adequately maintain contact with the network subscribers the GSM PLMN employs a number of databases. The main database functions are provided by two Location Registers, known as the Home location Register (HLR) and Visitor Locations Register (VLR).

The Home Location Register (HLR) contains all the information related to an operators subscriber database. The HLR is the main database for a network. The HLR stores both static and dynamic data related to the subscriber. Static data includes items such as International Mobile Subscriber Identity, subscriber MSISDN number and registered supplementary services. Dynamic data includes, for example, current location of the mobile user, in terms of VLR and MSC E.164 Number, and call forwarding numbers. The HLR downloads the required data to a VLR database when a Mobile User registers in a VLR area, it also provides the necessary functionality to terminate mobile calls.

The Visitor Location Register (VLR) stores the subscribers data, downloaded from the HLR, for mobile stations currently located in the VLRs area. The data stored in the VLR may include information from the Home HLR and foreign HLRs. The VLR is used to provide both Mobile Originated and Mobile Terminated call functionality. The VLR is defined as an independent database in GSM, however in order to optimize system performance many implementations combine MSC and VLR functionality, this effectively makes the MSC and VLR areas identical.

The remaining two databases are associated with security aspects of the network. The Authentication Center (AUC) is a secure database used to provide authentication keys, based upon a secret key (ki), to the HLR and subsequently the VLR for verifying the validity of the users subscription. The algorithm (A3) used to perform the authentication of the subscriber is stored in the users Subscriber Identity Module card and Authentication Center (AUC), only the challenge and result are sent on the radio interface. The challenge is also used by another algorithm (A8) to generate the key required by the A5 radio interface encryption algorithm. Although GSM defines possible A3 & A8 algorithms they are more realistically defined by the operator. The remaining database is the Equipment Identity Register (EIR) which contains a list of valid international Mobile Equipment Identity (IMEI) values. The database can therefore be used to control the use of stolen, non-type approved or faulty mobile equipment. When a mobile subscriber registers with the network the IMEI can be obtained and validated against the EIR data. If the IMEI is blacklisted, then action can be taken to prevent network access by the user.

Operations and Maintenance

Associated with the BSS and NSS equipment are Operations and Maintenance Center, OMC-R and OMC-S, respectively. The OMC-R provides the operations and maintenance control of the GSM BSS functions. The OMC-R is used to perform the following functions:

Configuration of the Cells, this includes allocation of radio frequency, handover parameters, cell parameters and timer values.

Performance monitoring. This function allows the OMC-R to receive statistical information about the various aspects of the BSS, such as number of calls, numbers of handovers etc.

Alarm reporting. The OMC-R is used to view and handle various alarms that are originated by the BSS. These may include hardware or software failures, loss of connections, etc Software Download. The OMC-R is responsible for providing and updating the software load to the BSS.

The NSS equipment is associated with the OMC-S. The OMC-S provides the same type of high level functions as the OMC-R. In addition the OMC-S may be used to provide user data administration for the HLR and VLR. However this function is more usually provided by a dedicated Administration Center which can also deal with Billing Server requirements and SIM data.

Services Provided by GSM

GSM was designed with ISDN interoperability as a prerequisite, consequently the services provided by GSM are a subset of standard ISDN services, however this is rapidly eroding as more ISDN services are developed within the GSM fora. The GSM system provides a range of Basic and Supplementary Services. The Basic Services are further subdivided into Teleservices and Bearer Services.

The Teleservices include:

Speech, the most basic service

Short Message, a two way messaging service

Group 3 FAX, this services allows connection to Group 3 FAX machines

Cell Broadcast, this service allows messages to be broadcast to the mobile stations.

The Bearer Services include:

Asynchronous Data 300-14400 bps, allows access to normal V-Series Modems

Synchronous Data 300-14400 bps, allows access to CSP-DNs

PAD Services

Packet Services

The Supplementary Services are intended to enhance the functionality of the Basic Services. The Phase 1 specifications only provide Call Forwarding and Call Barring Services. The Phase 2 Supplementary services included Line identification services, advice of charge, multi-party, call waiting and call hold. The Phase 2+ services will include Call Transfer, Call Completion Busy Subscriber (CCBS) and Optimal routing capabilities independent as possible from the underlying specifics of the mobile network. Another sublayer is Supplementary Services, which manages the implementation of the various supplementary services, and also allows users to access and modify their service subscription. The final sublayer is the Short Message Service layer, which handles the routing and delivery of short messages, both from and to the mobile subscriber.

Problems with the Existing GSM Architecture

The current GSM cellular system is designed for large telephone company installations, and is not cost-effective for installation of less than approximately 60,000 subscribers. Since the corporate market frequently has a need for fewer than 60,000 users, the current GSM cellular system does not adequately satisfy the market.

The standard cellular system uses expensive and large switching platforms that are limited to 64 kbps switching for voice or data traffic. In the networks currently installed by many operators world-wide, this 64 kbps fundamental limit prevents the cellular customer from receiving more advanced services such as video or high quality voice.

The current cellular systems use forms of Signaling System No 7 (SS#7) in order to establish the calls between mobile stations. Using this signaling system again prevents the user from attaining the maximum possible performance from the cellular network.

As wireless technology becomes more popular, corporations and other entities having private networks desire to make their workers mobile with the ability to access all voice and data information via wireless devices. Corporations might wish to integrate voice and data on a private Local Area Network (LAN). However using the current cellular systems it is not possible to cost-effectively integrate wireless systems with private networks.

In the case of multiple corporate sites that need to be networked together, there needs to be a method for communicating the location and identity of users. Normally this information must be handled by large, dedicated central office switches (MSC). However, it would be more optimal to allow wireless terminals to communicate directly without direct intervention by large telephone company equipment.

However, using current wireless technology, cellular phones are incompatible with private networks such as the corporate LAN which are based on the Internet Protocol (IP).

In accordance with the above background, it is an object of the present invention to provide wireless systems that are compatible with conventional cellular systems and with corporate networks including local area networks and the Intranet.

SUMMARY OF THE INVENTION

The present invention is a communication system formed by a private network that includes a private wireless network. The communication system also typically includes a public wireless network using a public wireless protocol, such as GSM, and typically includes public networks, such as PSTN, ISDN and the Internet, using a wired protocol, such as IP. The private network also typically includes a local area network (LAN) and the private network typically connects to the public networks using a wired packet protocol, such as IP.

In the present invention, the public and private wireless networks operate with the same public wireless protocol, such as GSM, and the private wireless network additionally operates with a wired packet protocol, such as IP.

The private wireless network uses private base stations (P-BTS) which include software for a wireless protocol, such as GSM, and include software for private network operation with a wired protocol, such as IP.

The communication system permits users to operate freely in both public and private wireless networks using standard mobile stations while achieving high private network data rates. The communication system typically uses normal wireless handsets or other mobile or fixed stations without need for any modifications.

The private base stations (P-BTS) in one embodiment are directly connected to a private LAN and thereby enable standard wireless stations to make and receive calls over the LAN. Also, the range of calls, using standard Internet protocols, extends between LANs and between different corporations over the Internet without requiring the support of a switch (e.g. MSC). The wireless stations can freely roam between the public wireless network and the private wireless network and a single telephone number can be assigned to a mobile station for use in both the public and the private wireless networks.

The foregoing and other objects, features and advantages of the invention will be apparent from the following detailed description in conjunction with the drawings.

DETAILED DESCRIPTION

Figure 1:
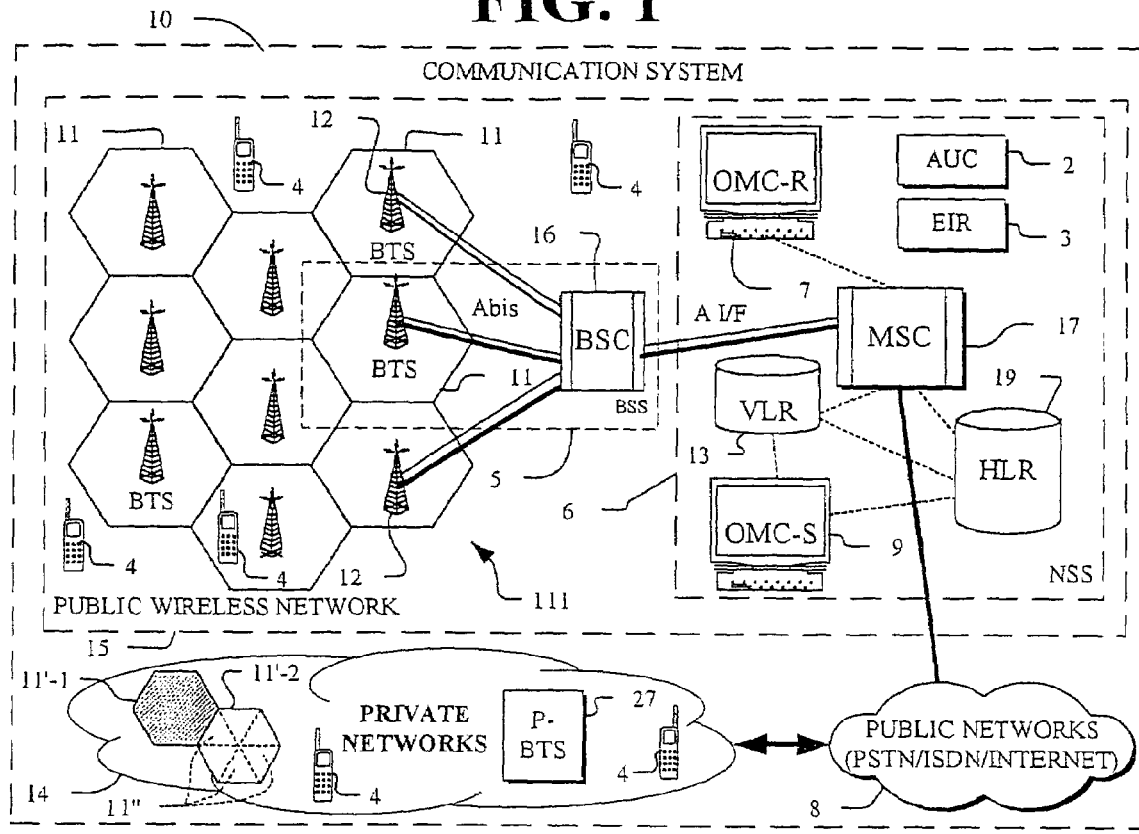
FIG. 1 is a block diagram representation of a communication system including a public wireless network, other public networks such as PSTN, ISDN and the Internet and including a private network.

Communication System—FIG. 1

In FIG. 1, the communication system 10 includes a conventional public wireless network 15, conventional public networks 8 (such as PSTN, ISDN and the Internet) and a private network 14. The public wireless network 15 includes the ability to communicate in a conventional manner with conventional wireless mobile stations 4. The private network 14 includes the ability to communicate with the conventional mobile stations 4 and provides additional private network capabilities not provided by the conventional public wireless network 15.

The conventional public wireless network 15 of FIG. 1 includes the mobile stations (MS) 4, Base Station Sub-System (BSS) 5 and the Network Sub-System (NSS) 6. The Base Station Subsystem (BSS) 5 is composed of the Base Transceiver Stations (BTSs) 12 and the Base Station Controller (BSC) 16. Each of the BTSs 12 includes a radio transceiver that defines the radio boundary of a cell 11 and handles the radio (Um) interface protocols with the mobile stations 4.

The cell 11, in the wireless public network 15, of FIG. 1 each exist over a different area and together the cells 11 collectively exist over a larger area designated as a region 111. Each cell 11 in the region 111 uses frequencies that are isolated from the frequencies of other cells in the region. As mobile stations 4 travel from a present cell 11 to a next cell 11, a frequency handover occurs from the frequencies of the present cell 11 to the frequencies of the next cell 11.

The private networks 14 of FIG. 1 include cells 11' (including for example cells 11'-1 and 11'-2) that each include a private P-BTS 27 for communications with mobile stations 4 located within the private networks 14. Also, any of the cells 11' can be sectorized so that different areas of a cell 11' are partitioned into different sectors. For example, cell 11'-2 has six sectors 11".

The cells 11' and or sectors 11", are within the domain of the private networks 14 of FIG. 1, and also they are particular ones of the cells 11 of the public wireless network 15 of FIG. 1. In today's environment, the allocation of frequency spectrum in different regions is under governmental control and is allocated to different entities in different regions of a country. The owner of the rights to particular frequencies in a region including public network 15 and private network 14 controls the allocation of frequencies among public cells 11, private cells 11' and sectors 11".

The Base Station Controller (BSC) 16 manages the radio resources of one or more BTSs across an Abis interface. The BSC 16 controls the radio network, including allocation of radio time slots to mobile stations 4, release of resources, interpretation of measurement results and control of radio interface handovers. The BSC 16 interfaces to the NSS 6 via an A-interface to MSC 17.

The Network Subsystem (NSS) 6 includes the Mobile services Switching Center (MSC) 17 that provides the functions required to switch calls to/from the mobile stations 4 and the fixed public networks 8 (including PSTN and ISDN). In addition, the MSC 17 also provides the functions needed to track and maintain communication with mobile stations 4 and these include registration, authentication, location updating, inter-MSC handovers, and call routing to roaming mobile stations 4. The GSM system employs a Home Location Register (HLR) 19 and a Visitor Location Register (VLR) 13, an Authentication Center (AUC) secure database 2 and an Equipment Identity Register (EIR) 3. The Operations and Maintenance Center includes the OMC-R 7 and the OMC-S 9.

Figure 2:
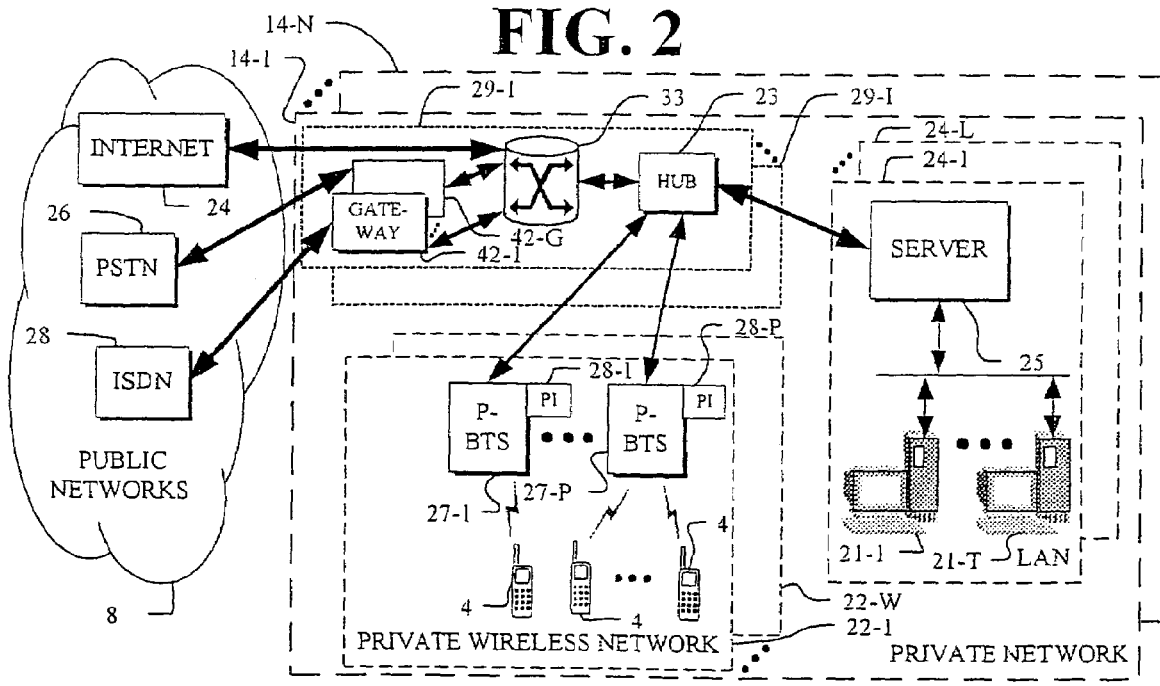
FIG. 2 depicts further details of the private network of FIG. 1.

Private Networks—FIG. 2

In FIG. 2, private networks 14 include private networks 14-1, . . . , 14-N. Private network 14-1 is typical and includes the private wireless networks 22 (including private wireless networks 22-1, . . . , 22-W), local area networks (LANs) 24 (including LANs 24-1, . . . , 24-L), and connection units 29 (including connection units 29-1, . . . , 29-I). The private networks 14 can include wide area networks (WAN) and any other type of network presently or hereafter available. The connection unit 29 includes a hub 23 for interconnecting the private wireless networks 22 and the LANs 24 and for connecting the private network 14-1 to the public networks 8. The hub 23 connects to the router 33 that directs calls among the public network facilities including the ISDN 28, . . . , PSTN 26 and the Internet 24 and the private networks 14. The private networks 14 use the same protocol as the Internet 25 and connect directly without need for a separate gateway. The connection unit 29 includes gateways 42-1, 42-2 . . . , 42-G for connecting the ISDN 28, PBX 43, . . . , PSTN 26 which use different protocols than the private networks 14.

In FIG. 2, the private wireless networks 22 include the wireless capabilities of the public wireless network 15 of FIG. 1. In addition, the private wireless network 15 operates with advanced technologies that are not yet available publically. Current advanced technologies operate with rates of 384 kb/s and are approaching rates of 2 Mb/s. In FIG. 1, wireless communications between the public BTSs 12 and mobile stations 4 operate with a wireless protocol such as GSM. In FIG. 2, wireless communications between the private P-BTSs 27 and mobile stations 4 for convenience and comparability operate with the same wireless protocol (such as GSM) as used by the public BTSs 12 in the public wireless network 15.

In FIG. 2, the local area networks (LANs) 24 are private wired networks operating with a wired packet protocol such as IP. LAN 24-1 is typical and includes, for example, a server 25 and LAN terminals 21 (including terminals 21-1, . . . , 21-T). Terminals 21-1, . . . , 21 -T communicate with each other and with the public networks 8 through connection unit 29 using the wired packet protocol.

In FIG. 2, the P-BTSs 27-1, . . . , 27-P are associated with protocol converters 28-1, . . . , 28-P, respectively, that connect P-BTSs 27-1, . . . , 27-P to connection unit 23 using the private network protocol used by the LANs 24 and the router 23. Therefore, the mobile stations 4 communicating through the P-BTSs 27 in the private networks 14 have access to the terminals 21 in LANs 24 and have access to the public networks 8. Further, the P-BTSs 27 in the private wireless networks 14 have available higher data rates than those available through the BTSs 12 in the public wireless network 15. In the example described in the present specification, private rates up to 384 kbps are possible whereas conventional public cellular networks only provide rates up to 64 kbps. Accordingly, data retrieval operations in the private networks 14 are better accommodated than in the public wireless network 15 of FIG. 1.

In FIG. 2, the wireless P-BTS 27 directly connect the mobile stations 4 through router 23 to other facilities in private networks 14 and thereby permit, for example, the mobile stations 4 to send and receive calls to and from the terminals 21 in the LAN networks 24. Furthermore, the range of calls from and to mobile stations 4 in the private wireless network 22, using standard Internet protocols (IP), extends over the Internet in public networks 8 to any Internet facility such as different LANs and different corporations in different regions or countries.

The private wireless networks 22 in FIG. 2 do not require the internal support of a circuit switch from the public networks and therefore, the private networks 14 in the FIG. 2 system can easily grow to accommodate new user requirements under control of the owners of the private networks 14.

In the private networks 14 of FIG. 2, the mobile stations 4 are typically unmodified, conventional wireless mobile station handsets like those widely used in conventional public wireless networks and therefore the mobile stations 4 can freely move between the public wireless network 15 of FIG. 1 and the private wireless networks 22 of FIG. 2 without restriction. Because of this free movement capability, only a single number is required for each mobile station 4 for both private wireless network communications and for public wireless network communications.

The private wireless networks 22 of FIG. 2 have P-BTSs 27-1-.1 27-P which correspond, for example, to the cells 11' and sectors 11" of FIG. 1. The allocation of frequencies among the public wireless network cells 11, the private network cells 11' and the private network sectors 11" is determined by agreement of the owners of the public wireless network 15 and the private networks 14.

Figure 3:
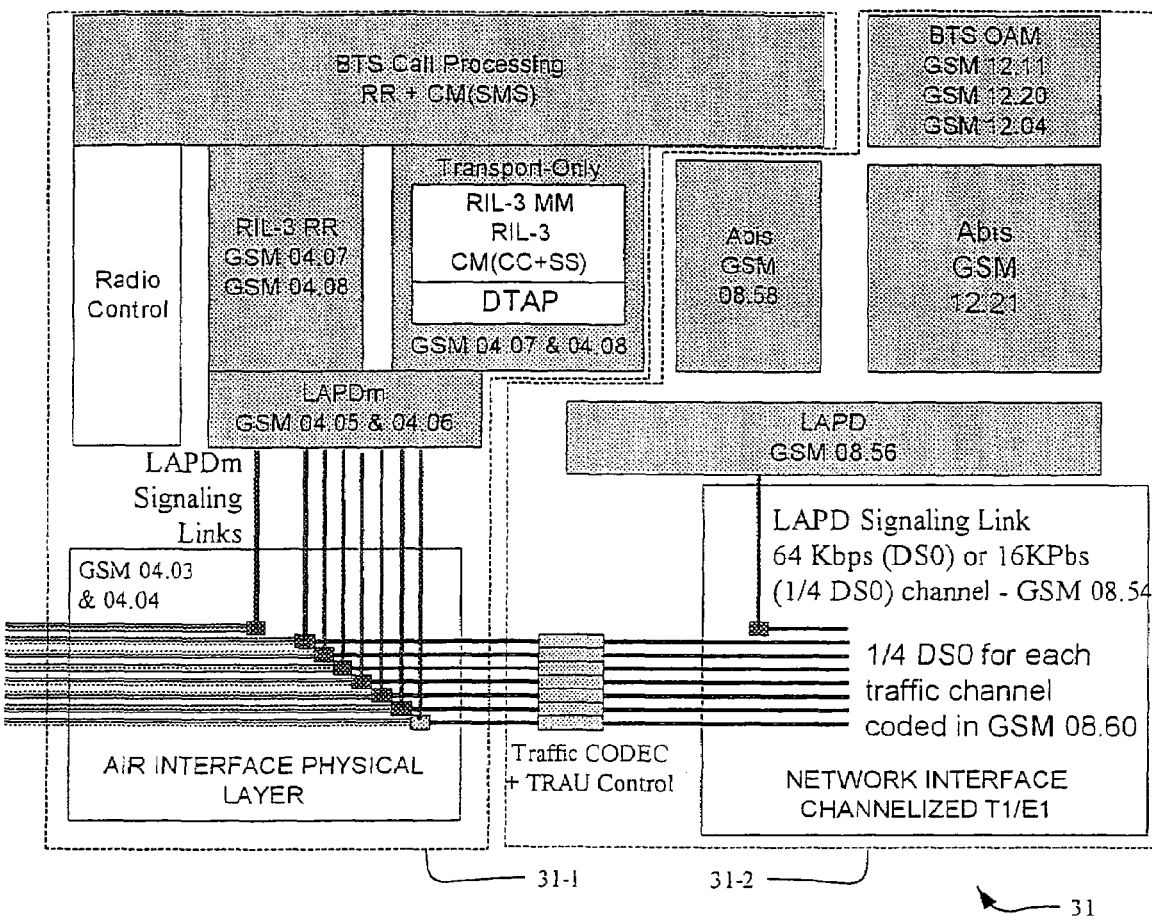
FIG. 3 depicts a GSM BTS architecture with added private network software.

GSM BTS Architecture—FIG. 3

In a GSM example of the present invention, the FIG. 1 public wireless network 15 includes conventional GSM basestation software 31 as indicated in FIG. 3 including the components 31-1 and 31-2. The software 31 and components 31-1 and 31-2 do not provide support for call control or connection to the private wired protocol (Internet Protocol) that is used in the private networks 14 of FIG. 1 and FIG. 2. Accordingly, the software 31 and components 31-1 and 31-2 require a protocol interface to facilitate interoperation of the wireless protocol and the wired packet protocol. For convinence, the protocol interfaces 28-1, . . . , 28-P are located with the P-BTSs 27-1, . . . , 27-P in the private wireless networks 14 of FIG. 2 and are described in detail hereinafter.

Figure 4:
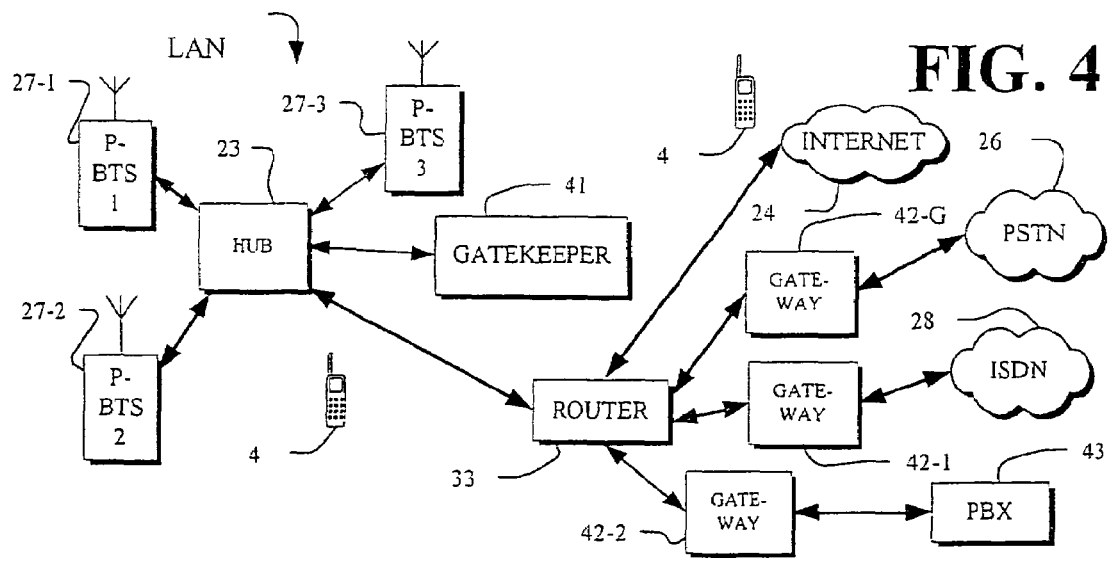
FIG. 4 depicts a LAN interconnection of private wireless base stations (P-BTSs).

P-BTS Architecture Overview—FIG. 4

The P-BTSs 27 are in the private wireless networks 14 of FIG. 1 and FIG. 2 deployed, in one embodiment, as shown in FIG. 4. In this embodiment, each P-BTS 27 contains the required protocol stacks to perform the functions of the wireless control signaling from the mobile station 4 and the H.323 Endpoint, gatekeeper 41 or gateway 42. In this embodiment, the H.323 Endpoint can be a PC based terminal 21 (see FIG. 2) or another mobile station 4. The gatekeeper 41 provides the functions necessary to control the "terminals" within the H.323 domain and, in this embodiment, "terminals" include GSM mobile stations 4.

The H.323 gatekeeper 41 provides the fumctions required to register the mobile stations 4 (equivalent to Location Updating), permit access to the network, translation of called numbers and routing of calls, if required. These functions are largely equivalent to those normally found in the MSC 17 or HLR 19 (see FIG. 1) of a public wireless network 15. The gatekeeper fumctions only need to exist in one P-BTS 27 of the P-BTS 27-1, P-BTS 27-2 and P-BTS 27-3 within the H.323 zone of FIG. 4. In the FIG. 4 example, P-BTS 27-3 provides the gatekeeper function within the H.323 zone of FIG. 4 and supports the operation of P-BTS 27-2 and P-BTS 27-1.

Figure 7:
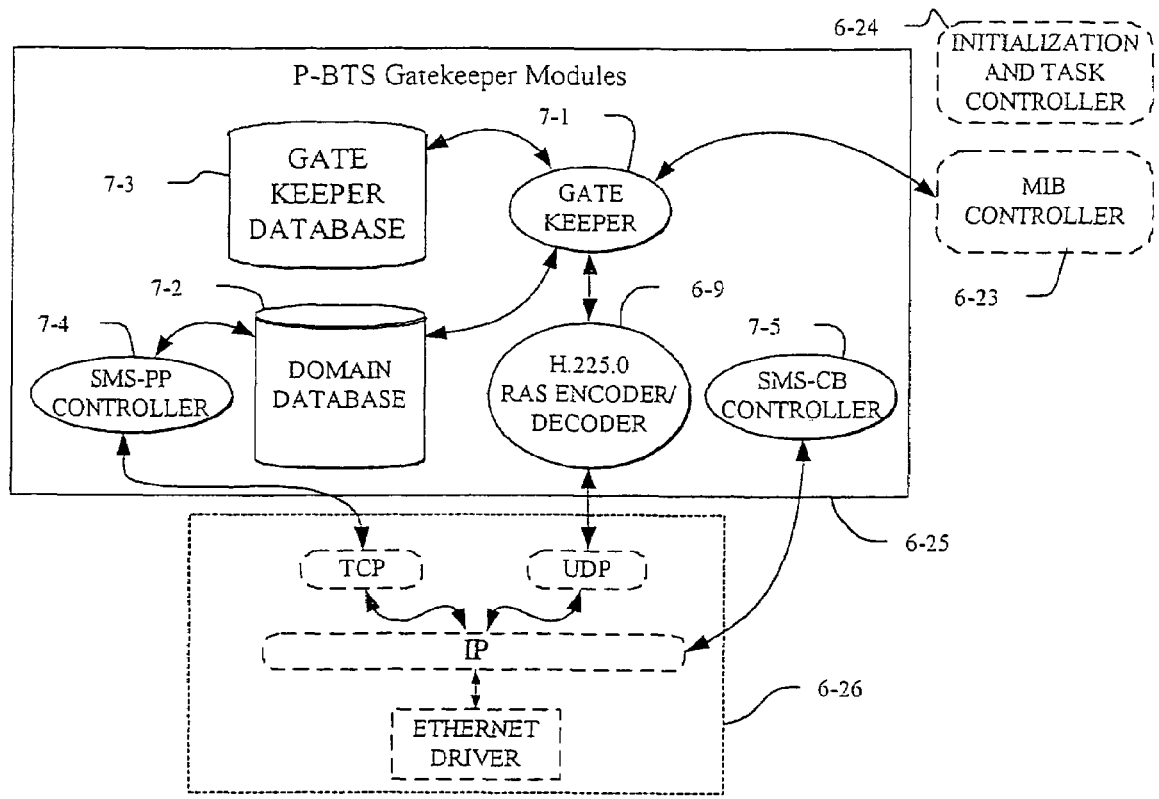
FIG. 7 depicts an IP-based private wireless base station (P-BTS) gate keeper plane of software modules.

In order to support the full range of wireless functions, the functions of a standard H.323 gatekeeper are augmented. The redesign includes the addition of a Local User Database (LUDB) 6-6 (See FIG. 6) to control the mobile station and provide Supplementary Services (SS) functionality. The gatekeeper database contents are transferred to the serving P-BTS when the mobile station 4 registers (that is, Location Updating has taken place) on a P-BTS. For example, if a mobile station 4 has registered on P-BTS 27-1 in FIG. 4 and the user data of mobile station 4 is stored with the gatekeeper 41 supported by P-BTS 27-3, then the relevant contents of the user database in P-BTS 27-3 are transferred to P-BTS 27-1 when the registration takes place. Any updates or alterations to the data by interaction of mobile station 4 are reflected back to the main gatekeeper database 7-3 stored in the gatekeeper 41 (See FIG. 7). This approach reduces the amount of call control signalling that is required within a LAN and provides redundancy for increased reliability that is required within a LAN and provides redundancy for increased reliability.

In order to provide external PSTN or public wireless network interconnection, an H.323 gateway 42 is provided in FIG. 4. The gateway 42 is part of the normal VoIP LAN-PSTN operation. The gateway 42 provides line interface and transcoding functions that allow the voice and data traffic to be sent to existing networks (for example, PSTN, ISDN, B-ISDN, PBX).

An additional function required of a P-BTS 27 when used in a LAN environment of FIG. 4 is the ability to control the handover of mobile stations 4 between different P-BTSs 27 as mobile stations 4 move around within the LAN zone serviced by the private networks 14 of FIG. 4 and FIG. 2. The handover decision is made internally within each P-BTS 27, only the signaling necessary to command a handover needs to go between the P-BTSs 27.

Figure 5:
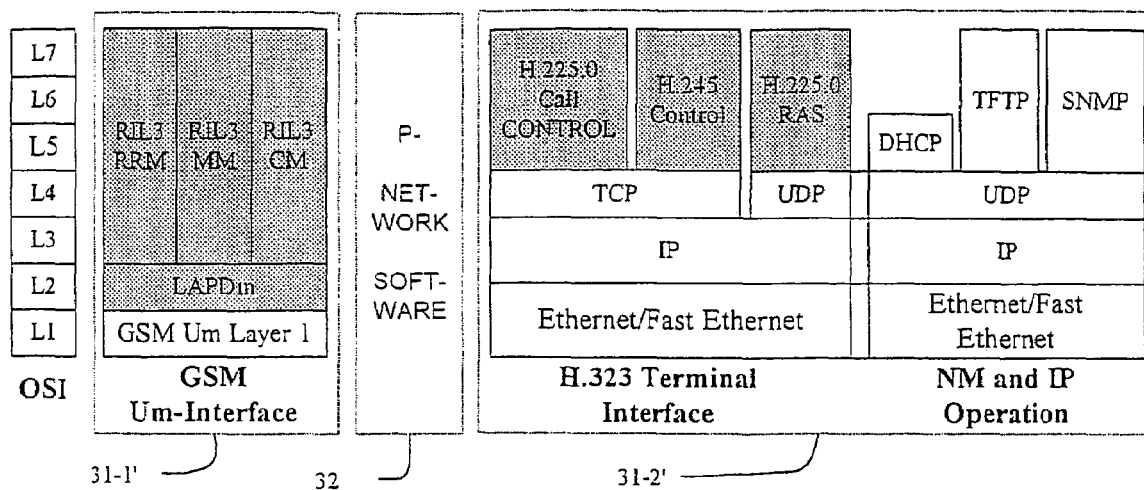
FIG. 5 depicts primary interface protocol stacks for IP-based private wireless base stations (P-BTS).

Protocol Stacks for Signaling—FIG. 5

To support the architecture, the standard GSM stack 31 of FIG. 3 is modified by the P-Network Software 32 as shown in the FIG. 5. In FIG. 5, the components 31-1' and 31-2' are equivalent to the components 31-1 and 31-2 in FIG. 3. As can be seen from FIG. 5, in addition to the private Wireless Air Interface requirements and the H.323 Terminal Equipment requirements, the LAN based P-BTS 27 also provides the following functionality:

Interworking between the two Call Control Functions—private wireless and LAN based Private Wireless Mobility Management (there is no BSC or MSC in stack 31 of FIG. 3).

Figure 6:
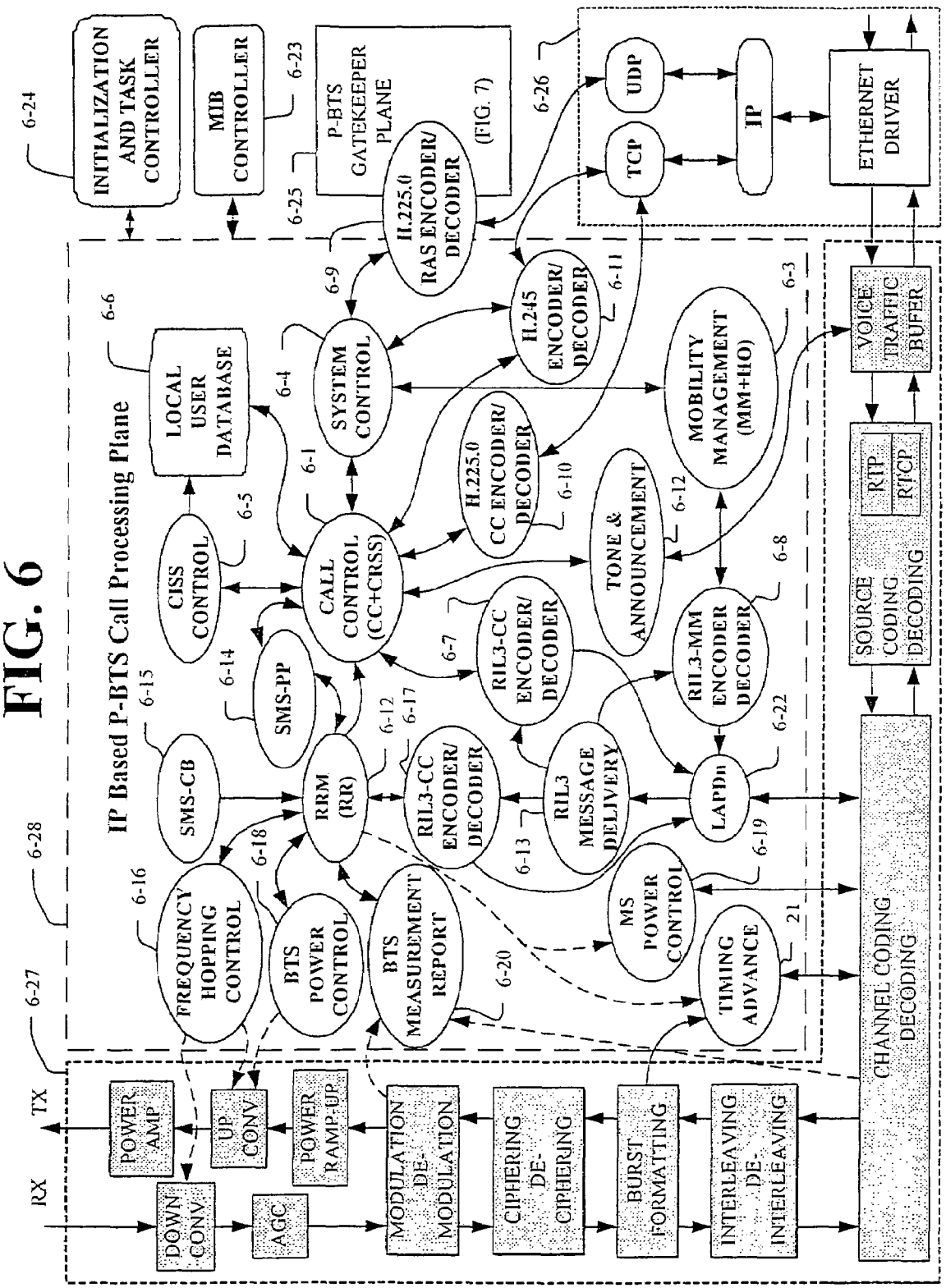
FIG. 6 depicts a call processing plane of software modules for IP-Based private wireless base stations (P-BTS).

The Call Processing Plane Software Modules are significantly more complicated than those found in a normal public BTS and are defined in FIG. 6.

Call Processing Plane Software Modules for IP-Based P-BTS—FIG. 6.

In FIG. 6, the software modules for the call processing plane include modules used for IP-based operation of P-BTSs 27 as follows:

Call Control Module—The module 6-1 is responsible for the "call feature control" function for the mobile station, including both basic Call Control (CC) as well as Call Related Supplementary Services (CRSS).

The CRSS handled by this module include:
Calling Line Identification Presentation (CLIP)
Calling Line Identification Restriction (CLIR)
Connected Line Identification Presentation (COLP)
Connected Line Identification Restriction (COLR)
Call Forwarding Busy (CFB)
Call Forwarding No Reply (CFNR)
Call Forwarding Unconditional (CFU)
Call Waiting (CW)
Call Hold (HOLD)
Multi-Party Service (MPTY)

The Call Control Module is not merely an "interworking between the private Wireless Call Control and ISDN Call Control messages." It is required to carry out the feature control functions, such as connecting voice path, providing tones and announcements when call is not answered, working with Private gatekeeper entity in the local zone to obtain appropriate resource (e.g. conference circuit), forwarding a call, and managing call waiting and call hold features.

Tone and Announcement Module—The module 6-2 handles the actual generation of the various tone and announcement used according to the Call Control based on different call handling situation. Tone and Announcement are usually played towards the "far-end" this will be the LAN direction in this case, where only a tone is played toward the local Mobile Direction.

Mobility Management Module—The module 6-3 is responsible for handling the Mobility Management Function of the mobile station, including location update and handover control/co-ordination. This function was originally located in the private wireless MSC and is fulfilled in the IP-based P-BTS. It also provides the ability to find a terminating mobile station and the ability to handle the call when the mobile station moves from one P-BTS to another P-BTS.

System Control Module—The module 6-4 is responsible for the End-Point registration, Administration, and status reporting in LAN. This entity is the "end-point" function and does not cover the gatekeeper functions which may be resident on the same P-BTS as well.

CISS Controller Module—The module 6-5 controls all the Call Independent
  Supplementary Services (CISS) for the mobile station that is registering through or served by the current P-BTS. The services include:
  Subscriber activation/deactivation of various supplementary features, such as call waiting, call hold, call forwarding, etc.
  Subscriber programming of the supplementary Service, such as the forwarded-to number when the mobile station is busy.
  Most of the CISS features are of the interrogation type with the subscriber setting information in the domain user database. This module is responsible for updating the local user database(LUDB), while the LUDB is responsible for ensuring the changes are carried back to the domain user database (an HLR like database in the gatekeeper) correctly.
Local User Database Module (LUDB)—The module 6-6 maintains a copy of user data for each of the mobile stations that is registered on the current P-BTS. The data is stored in local memory as a "cache." Any changes to the local copy will be "written-back" to the domain user database automatically. All the other modules who need the user data to operate interact with the Local User Database module for the data interrogation. The Local User Database Module will interact with the Domain User Database Module when necessary and does it in a way that is transparent to all the other modules in the P-BTS.
  RIL3-CC Encoder/Decoder Module—The module 6-7 is responsible for encoding and decoding the GSM Radio Interface Layer3 Call Control messages.
  RIL3-MM Encoder/Decoder Module—The module 6-8 is responsible for encoding and decoding the GSM Radio Interface Layer3 Mobility Management messages.
  H.225.0 RAS Encoder/Decoder Module—The module 6-9 is responsible for encoding and decoding the H.225.0 Registration Administration and Status (RAS) messages. This module is shared between Call Processing Plane and the gatekeeper Plane.
  H.225.0 CC Encoder/Decoder Module—The module 6-10 is responsible for encoding and decoding the H.225.0 Call Control messages. The H.225.0 Call Control Message is based on ISDN Q.931 Message Set.
  H.245 Encoder/Decoder Module—The module 6-11 is responsible for encoding and decoding the H.245 messages. The H.245 specification defines a set of messages for controlling the allocation and management of the logical channels for multimedia applications.
  RRM Module—The module 6-12 is responsible for the entire Radio Resource Management functionality that is normally split between the BTS and the BSC in the traditional architecture. The RRM Module will directly interface with the Call Control Module for radio resource functions, such as channel set-up, paging, etc.
  RIL3 Message Delivery Module—The module 6-13 is responsible for looking into the protocol discriminator field in the layer-3 message header to determine which module has to process this message. The delivery of the CC message will now be sent to the RIL3-CC Encoder/Decoder Module, and the MM message to the RIL3-MM Encoder/Decoder Module.
  SMS-PP Controller Module—The module 6-14 is responsible in handling the Point-to-Point SMS messages that are to be delivered to the target mobile station.
  SMS-CB Controller Module—The SMS-CB module 6-15 is used to keep track of the functionality of receiving and distributing the SMS CB messages that are to be broadcast by all or part of the P-BTSs within the current H.323 Zone.
  Frequency Hopping Control Module—The module 6-16 controls the frequency of communications for the target mobile station.
  RIL3-RR Encoder/Decoder Module—The module 6-17 decodes and encodes the RIL3-RR messages to and from the BTS internal RR message formats. The formats of the RIL3-RR messages are specified in the GSM Technical Specification 04.08 along with the RIL3-MM, RIL3-CC, RIL3-SS, and RIL3-SMS messages specifications. This module provides the encoding and decoding of the RIL3-RR message which is required for the P-BTS.
  BTS Power Control Module—The module 6-18 is responsible for providing the P-BTS power control (down-link) both statically and dynamically. The P-BTS Power Control Module takes the Mobile Uplink Measurement Data that is sent from a mobile, that is in dedicated mode, and compiled to provide the best power adjustment strategy for the given mobile. The goal is to maintain the P-BTS power in the optimal level so that the signal strength and signal quality for the down-link signal is within the private wireless quality guideline without causing excessive interference to the adjacent cell sites that are using the same or adjacent frequencies.
  MS Power Control Module—The module 6-19 interfaces with the Channel Encoding and Decoding to add/retrieve the power control information into/out-off the header fields of the Layer 1 messages. The retrieval of the Mobile's up-link power level and the encoding of the command to instruct Mobile Station to increase/decrease the output power should be separated from the intelligence of performing sliding window algorithm over Mobile's power level and making decision to increase or decrease the MS power level.
  BTS Measurement Report Module—The module 6-20 interfaces with GSM burst processing components to obtain the P-BTS measurement of the Mobile uplink signal. Specifically, the Automatic Gain Control and Demodulator for uplink power-level, and the Channel decoding unit for signal quality. Depending on the actual hardware architecture the input may come from more than just the three components identified above.
  Timing Advance Module—The module 6-21 interfaces with the Burst Format function and retrieves the burst delay information for the Mobile, and then interfaces with the Channel Encoding and Decoding to add the Mobile timing advance information into the layer-I header field. The Timing Advance Module can be treated as part of the Traffic Channel Processing Domain or as part of the Call Processing Domain. It autonomously monitors the delay of the arriving burst and instructs the burst formatting function to encode the amount of timing-advance that the mobile station needs to do in order to let the burst arrive within the burst envelope that the BTS is expected.
  LAPDn Module—The module 6-22 interfaces the message delivery to the channel coding/decoding.
  IP-based P-BTS Gate Keeper Plane Software Modules—FIG. 7 In FIG. 7, the gatekeeper plane for gatekeeper 41 of FIG. 4 contains the modules which realize the wireless gatekeeper functionality as well as a combined Local/Domain User Database. Only one P-BTS 27 within each zone normally will have this plane-activated. It is also possible to have the gatekeeper 41 run in a dedicated mode without sharing the responsibility of a P-BTS function. Therefore, logical separation is maintained between the two entities even though they are expected to co-exist in the same hardware platform for many deployment scenarios. The IP-based P-BTS Gate Keeper Plane Software Modules include:

Gatekeeper Module—The module 7-1 is responsible for the gatekeeper functionality as stated in the H.323 Specification. In one embodiment, the P-BTS may contain a gatekeeper entity along with an End-Point entity. Even though the gatekeeper is almost always consulted by the Call Control and System Control entities in the end-point, the above diagram does NOT show a direct connection among them. If all the entities are co-located in the same P-BTS, the traffic will actually go all the way to the IP layer, through the IP loopback driver, and back to the correct entity.

Domain User Database Module—The module 7-2 maintains the Mobile User's database for the "Home Zone." It is similar to the functionality provided by the GSM HLR, but without using GSM MAP for accessing the content of the database from the GSM MS C. The Domain User Database (DUDB) is responsible for communicating with the Local User Database Module (LUDB) to provide a "cached copy" of the user data when the mobile station performs a location update through the serving P-BTS. The Domain User Database Module will be responsible for informing the Local User Database Module about the changes to the user data when that happens. These include the delivery of Point-to-Point Short Messages to the mobile station, the update from the network operator in changing the subscription information of the mobile user, and Mobile User performs another location update. Changes can be triggered in reverse direction from the Local User Database to the Domain User Database, such as Mobile User performs a Call Independent Supplementary Service to program its supplementary services. In all cases, the Domain User Database Module in the Gate Keeper only interacts with the User Local Database Module in the P-BTS and not the various Call Control or CISS Modules directly.

Gate Keeper Database Module—The module 7-3 maintains the gatekeeper's database regarding all the mobile stations in the same zone as well as information regarding other gatekeepers in the connected network.

SMS-PP Controller Module—The module 7-4 is responsible in handling the Point-to-Point SMS messages that are to be delivered to the target mobile station. The module 7-4 is the same as the module 6-14 in the Call Processing Plane of FIG. 6.

SMS-CB Controller Module—The SMS-CB module 7-5 is used to keep track of the functionality of receiving and distributing the SMS CB messages that are to be broadcast by all or part of the P-BTSs within the current H.323 Zone. The module 7-5 is the same as the module 6-15 in the Call Processing Plane of FIG. 6.

H.225.0 RAS Encoder/Decoder Module—The module 7-6 is the same as the module 6-9 as described in the Call Processing Plane of FIG. 6.

Figure 8:
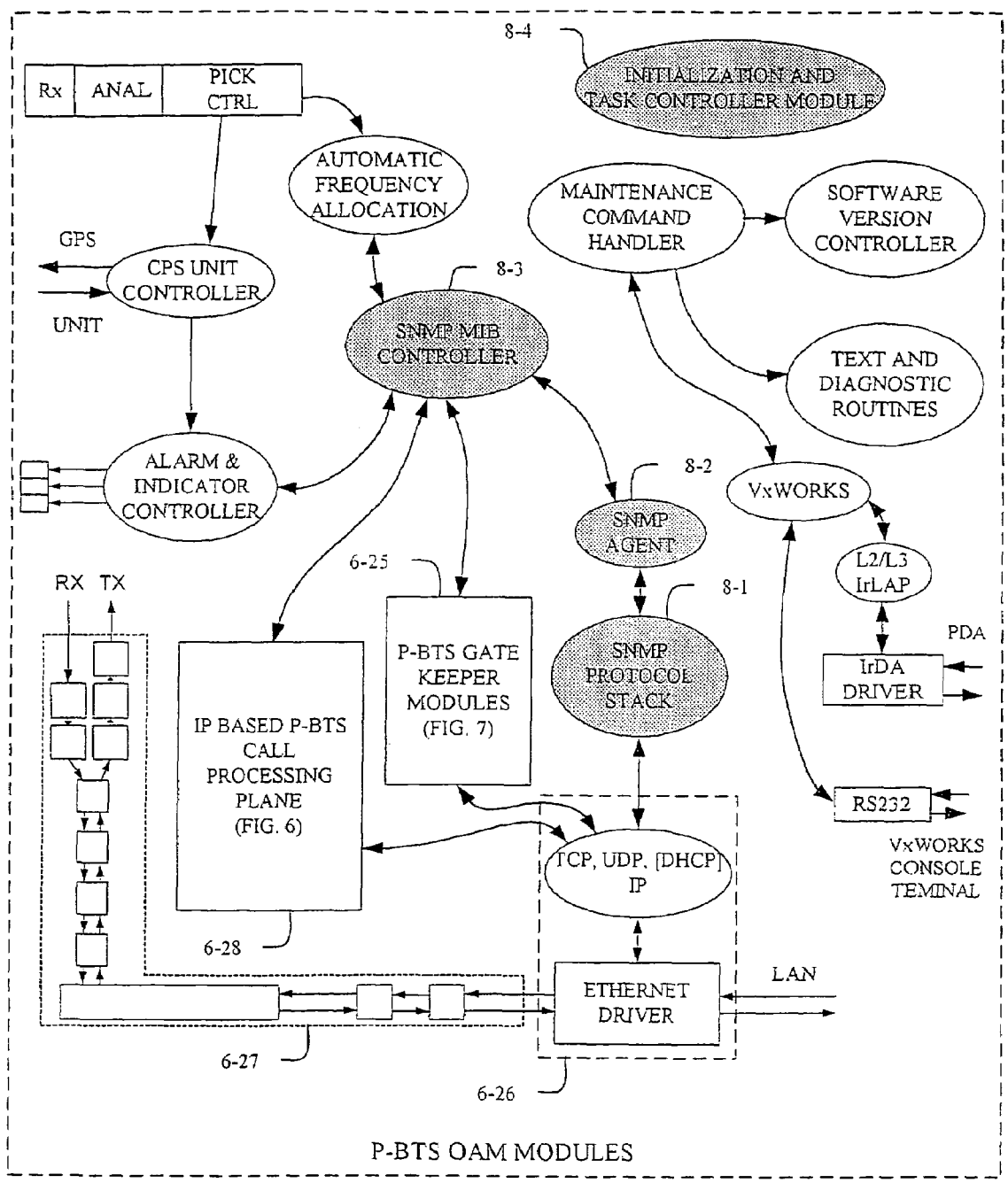
FIG. 8 depicts IP-Based private wireless P-BTS OAM Software Modules.

IP-Based P-BTS OAM Software Modules—FIG. 8

The OAM Software Modules for the IP-Based P-BTS uses an. SNMP based Management Information Base (MIB). The new modules beyond those found in a normal public BTS are as follows:

SNMP Protocol Stack Module—The module 8-1 is the SNMP protocol stack as used to control the SNMP MIB.

SNMP Agent—The module 8-2 provides the agent side code to perform the action request from the SNMP manager via the SNMP protocol.

SNMP MIB Controller Module—The module 8-3 is responsible for maintaining the SNMP MIB (a logical view, from maintenance perspective, for all the resources) for the PBTS. The remote OAM commands from, for example an OMC-R are all carried out via changes to the MIB. The MIB controller than interprets the changes and performs the maintenance actions. Alarm and Performance reports from the P-BTS will also be collected and stored in the MIB. This module handles all the SNMP MIB, including additional configuration and controlling attributes for the H.323 aspects of the P-BTS. Furthermore, the CC and MM functionality and RR functionality is also managed by this module.

Initialization and Task Control Module—The module 8-4 is responsible for handling the initialisation of all the other Software Modules, establishing communication, and monitoring the health of all these processes through heart-beat (keep-alive timer) mechanisms.

Network Operations

This section describes several scenarios to demonstrate how an Intranet-based P-BTS 27 using the modules described above and deployed as shown in FIG. 4 provides the same type of services that are normally provided by a public cellular system that is based upon the conventional GSM architecture. The following scenarios are representative of those required for the support of cellular service and other scenarios can be constructed from these building blocks.

Mobile Terminal Registration (Location Updating)
Private Terminal in Private Domain
Private Terminal in Public Domain
Public Terminal in Private Domain
Private Mobile Originated Call to:
Private Mobile or Fixed Terminal Located in Private Domain
Private Mobile or Fixed Terminal Located in Public Domain
Public Mobile Located in Private Domain
Public Mobile or Fixed Terminal Located in Public Domain Mobile
Terminated Call from:
Private Mobile or Fixed Terminal Located in Private Domain
Private Mobile or Fixed Terminal Located in Public Domain
Public Mobile Located in Private Domain
Public Mobile or Fixed Terminal Located in Public Domain
Handover within the LAN based P-BTS network.

It has been assumed in all the scenarios described below that the P-BTS handling the call has already performed the required registration phase with its "local" wireless gatekeeper 41 entity(See FIG. 4). It should also be noted that the P-BTS 27 handling the call may also be another P-BTS acting as the gatekeeper within the domain.

In the scenarios described below the following assumptions and definitions are used:

A Private Network in the cases described below is a network based upon the P-BTS running with the modules described above. The user data for the mobile stations is located in the private network gatekeeper 41 (See FIG. 4).

A Private Network Operator is considered to be the owner (for example corporation or other entity) of the private network including the P-BTS units. It may be that the private wireless network is managed by the public network operator with guidance from the private network owner.

A Private Mobile is a wireless station that is serviced by the private network. The mobile station is also permitted to roam into the domain service by the public wireless network depending upon agreements between the operator of the public wireless network and the owner of the private network.

A Private Fixed Terminal is a terminal that is located on the LAN or attached PBX that is fixed in location. This may also be a normal fixed PBX phone or a phone attached to a desktop PC.

A Public Network is a normal public wireless network under the control of a licensed operator. The network contains the usual cellular entities such as MSC, VLR or HLR.

A Public Wireless Station is a wireless station that is primarily located on the cellular public wireless network. The mobile wireless station may also be permitted to roam into the private wireless domain depending upon agreements between the operator of the public wireless network and the owner of the private network. The user data for this mobile user is located in the Public Network operators HLR.

A Public Network Operator is considered to be the licensed owner of a public wireless network into which the domain of the private wireless network falls as related to the relevant spectrum.

In the cases described below, it is assumed that the mobile station 4 is a standard wireless station that need not have been modified. In such a case, the wireless station is a subscriber, having an Identity Module (SIM) card to identify the subscriber and contains a unique International Mobile Equipment Identity (IMEI).

In the descriptions below, it is assumed that the "network" is capable of performing number translations that allow calls to reach the private network gateway 42 (See FIG. 4) or the relevant public cellular network. This assumption implies that the wireless station number is unique within the national numbering plan.

Mobile Terminal Registration

The registration operation needs to be performed for three different scenarios:

Private Terminal in the Private LAN Zone.
Private Terminal in the Public Wireless Network.
Public Terminal in the Private LAN Zone.

Within each of these scenarios there are several variations that may be considered. In particular, one of the major items that will impact the operation of the private network is the varying registration requirements that may be placed on the private mobile station 4. In each of the sections below, the possible options are discussed in terms of the differences between the private network procedure and/or the normal public cellular network procedure.

Private Terminal Registration in the Private H.323 Zone

Figure 9:
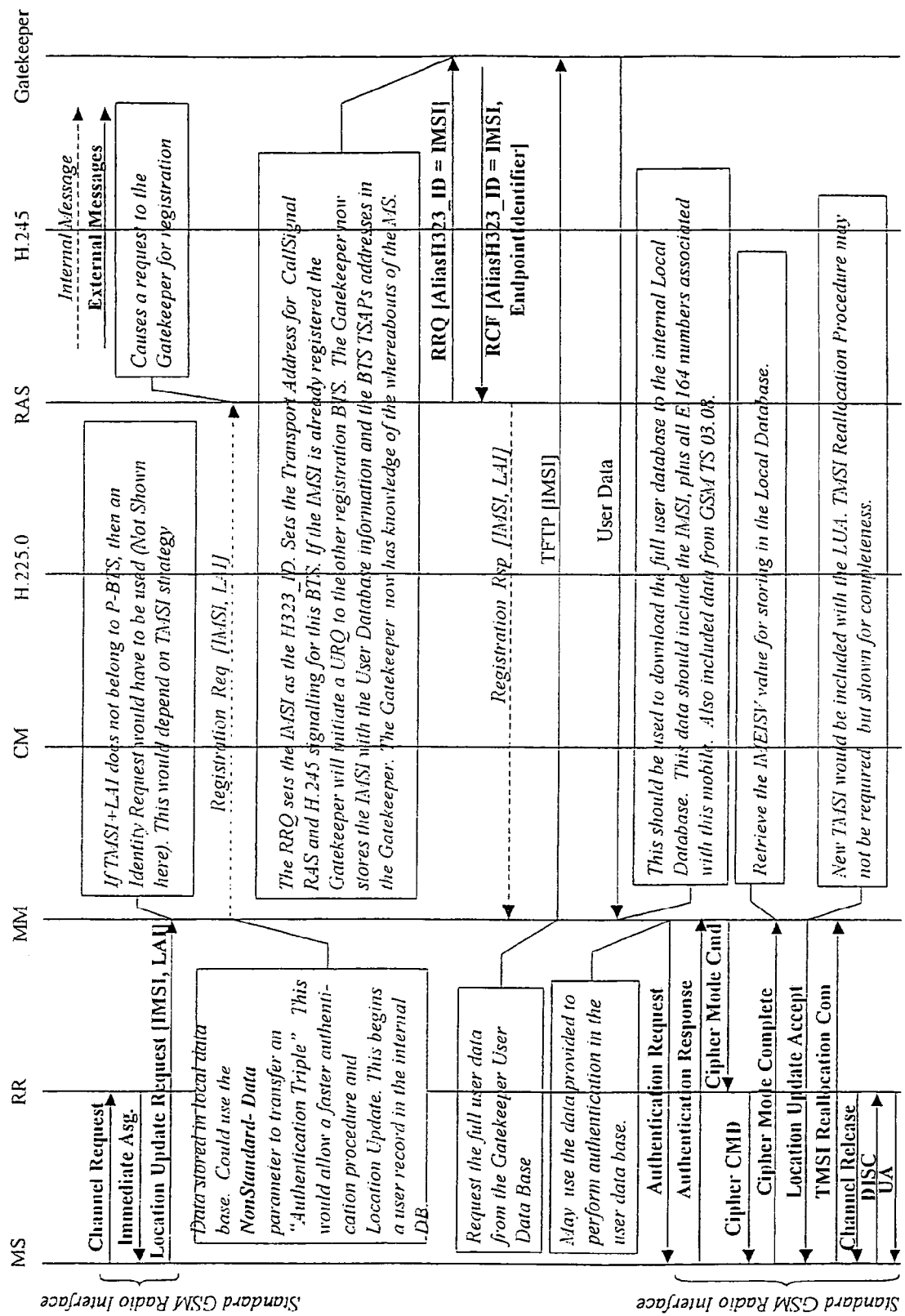
FIG. 9 depicts a Location Registration Procedure.

The terminal registration phase in the private LAN network is designed to appear identical to that found in a Public Wireless Network as far as the Private mobile station is concerned. In order to accomplish this operation, the P-BTS is required to broadcast, on the Broadcast Control Channel (BCCH), the same type of information as is found in a "normal" public wireless network 15. When the terminal detects and decodes the broadcast channel information, it can then perform the usual registration function as shown in FIG. 9. The registration function in this case would be terminated at the wireless gatekeeper database. As an alternative, the wireless gatekeeper can also contact a Public HLR database to retrieve the User data for use by the P-BTS.

The signaling between the P-BTS and P-BTS/gatekeeper function uses the standard H.323 Registration Request (RRQ) message sequence. If the RRQ sequence fails, then a Location Reject messages is used to terminate the procedure with the mobile station. The sequence shown in FIG. 9 is made up of a number of phases as follows.

Phase 1: This phase is the normal Location Update request made by the mobile station when it detects its Private (home) network. In this case the Mobility Management (MM) layer in the P-BTS will terminate the signaling for this message.

Phase 2: When the MM receives the Location Update request it must initiate a registration with the private wireless gatekeeper. In order to perform this operation H.323/RAS signaling is used to send a Registration Request (RRQ) to the private wireless gatekeeper. The RRQ message will contain the IMSI of the registering mobile station, Call Signal, RAS and H.245 Transport Addresses for the P-BTS.

If the IMSI associated with the Private mobile station is already registered with this serving P-BTS then the registration, as an option, need not be checked with the gatekeeper. However in this case it would be more usual to expect an "IMSI attach" rather than a Location Update request.

If the TMSI security option is to be used within the Private domain then on first registration it will be necessary to retrieve the IMSI if the Location Area Identifier (LAI) is not recognized by the P-BTS receiving the Locate Update request.

Phase 3: When the gatekeeper receives the RRQ it will check that the IMSI (or TMSI+LAI) presented in the RRQ is permitted to register on the Private Network. This function allows the Private Network Operator to control access to the network. It is possible to enable or disable access to the network for Private or Public network users. After checking the IMSI the private wireless gatekeeper may take several actions dependent upon how the system has been configured.

If the IMSI belongs to a private mobile station and the user data for that mobile station is located in the gatekeeper database then the gatekeeper can return a Registration Confirmed (RCF) message to the requesting P-BTS. If the Private mobile station is already associated with another address (e.g. another P-BTS) then the gatekeeper can perform an Unregister Request (URQ/UCF/URJ) sequence to the old P-BTS address in order to eliminate duplicate information. It should be noted that this operation sequence for the H.323 stack is unique to this implementation of the Invention.

If the IMSI belongs to a Private mobile station and the user data for the mobile is not located in the gatekeeper then the gatekeeper requests the information for this user from another gatekeeper located elsewhere within the Private network. This requires the transfer of data to this gatekeeper before the processing can continue as described above.

If the IMSI belongs to a Public mobile station or to a Private mobile station required to use the Public HLR then the gatekeeper requests the relevant database information from the Public Network HLR via a suitably modified Private wireless gateway. The Private to Public gateway in this case takes the internal H.323 signaling and translate that into Private wireless specific signaling for interworking with the Public Network HLR. In this case the data is relayed to the serving P-BTS. It also possible that the Public Network HLR will reject the request in which case the Location Update request from the Mobile User must also be rejected. If the HLR accepts the request then it must store the E.164 number of the "gateway" in order to deal with Mobile Terminated Calls.

Phase 4: After the registration phase has been completed the data must be transferred from the Private wireless gatekeeper to the Serving P-BTS. In FIG. 9 this is shown by the TFTP message, however this is only used as an example other techniques could be used dependent upon the amount of data to be transferred. If small amounts of data are to be moved then it could be added to the RCF message or an new message could be used based on the H.323 "Non Standard Message" option. The exact option used does not affect the outcome required by this invention.

Phase 5: Once the data has been transferred to the serving P-BTS the registration procedure can be completed to the mobile station.

Location Registration Procedure—FIG. 9

In FIG. 9, the private mobile station registration in Public GSM PLMN is depicted. The exact method used to register the private mobile station in the Public Network will depend upon the network configuration. Two options are described below where it is assumed that the private mobile station is permitted to register in the Public Network.

Private Network Database: If the user data is held in a Private Network database on the Private wireless gatekeeper, as outlined above, then when the Private mobile station registers in the Public Network the serving MSC will have to access this database via the gateway function. The Private wireless gatekeeper will retain the MSC and/or VLR Number in this case for use with Mobile Terminating Calls.

Public Network Database: If the user data is held in the Public Network HLR, then the registration procedure is as per a normal GSM registration procedure.

Public mobile station Registration in the Private H.323 Zone: In the case of the Public mobile station registering in the LAN zone, the Private wireless gatekeeper interrogates the Public Network HLR that is the home location for the public mobile station.

Figure 10:
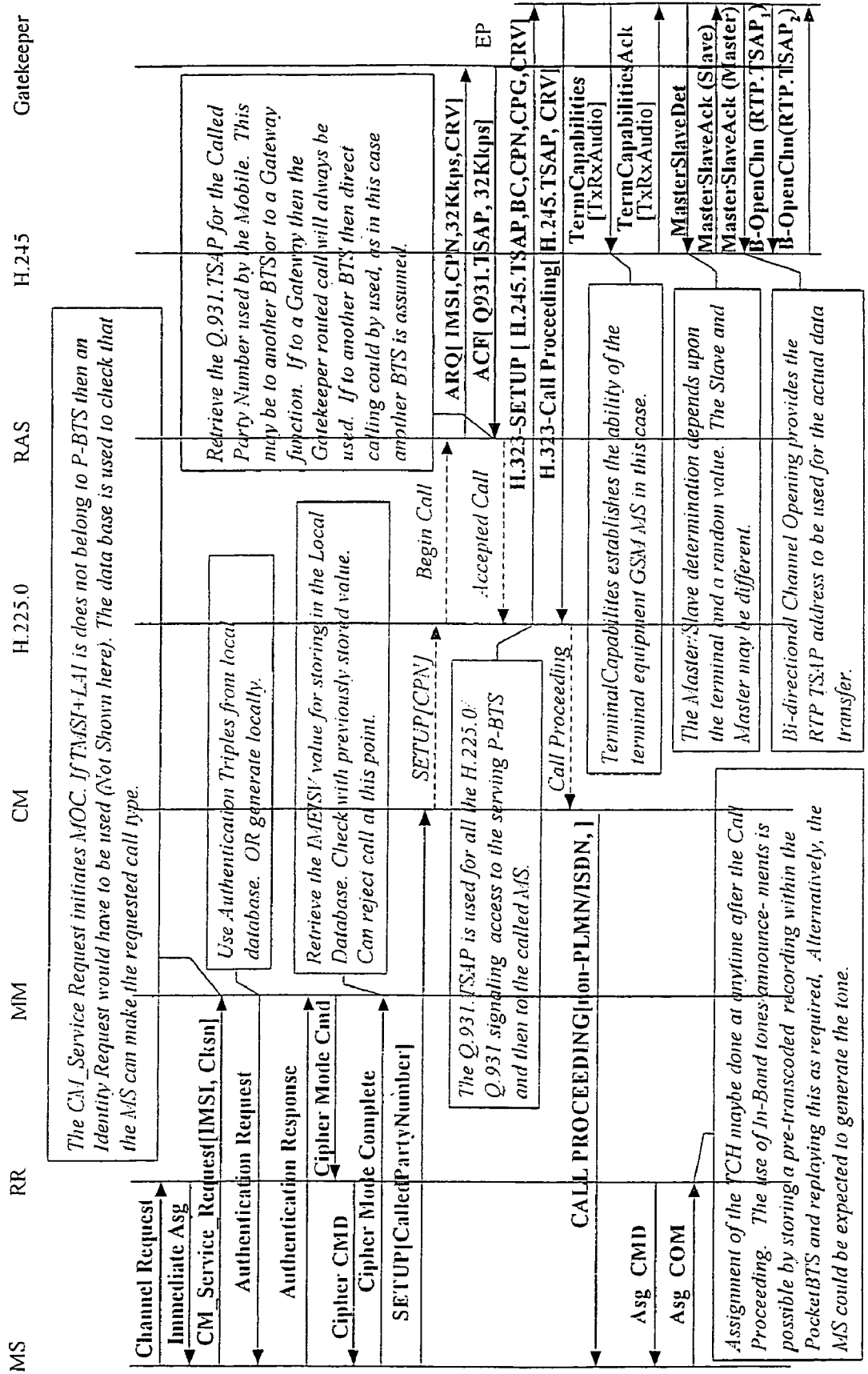
FIG. 10 depicts the first phase of processing a mobile originated call.
Figure 11:
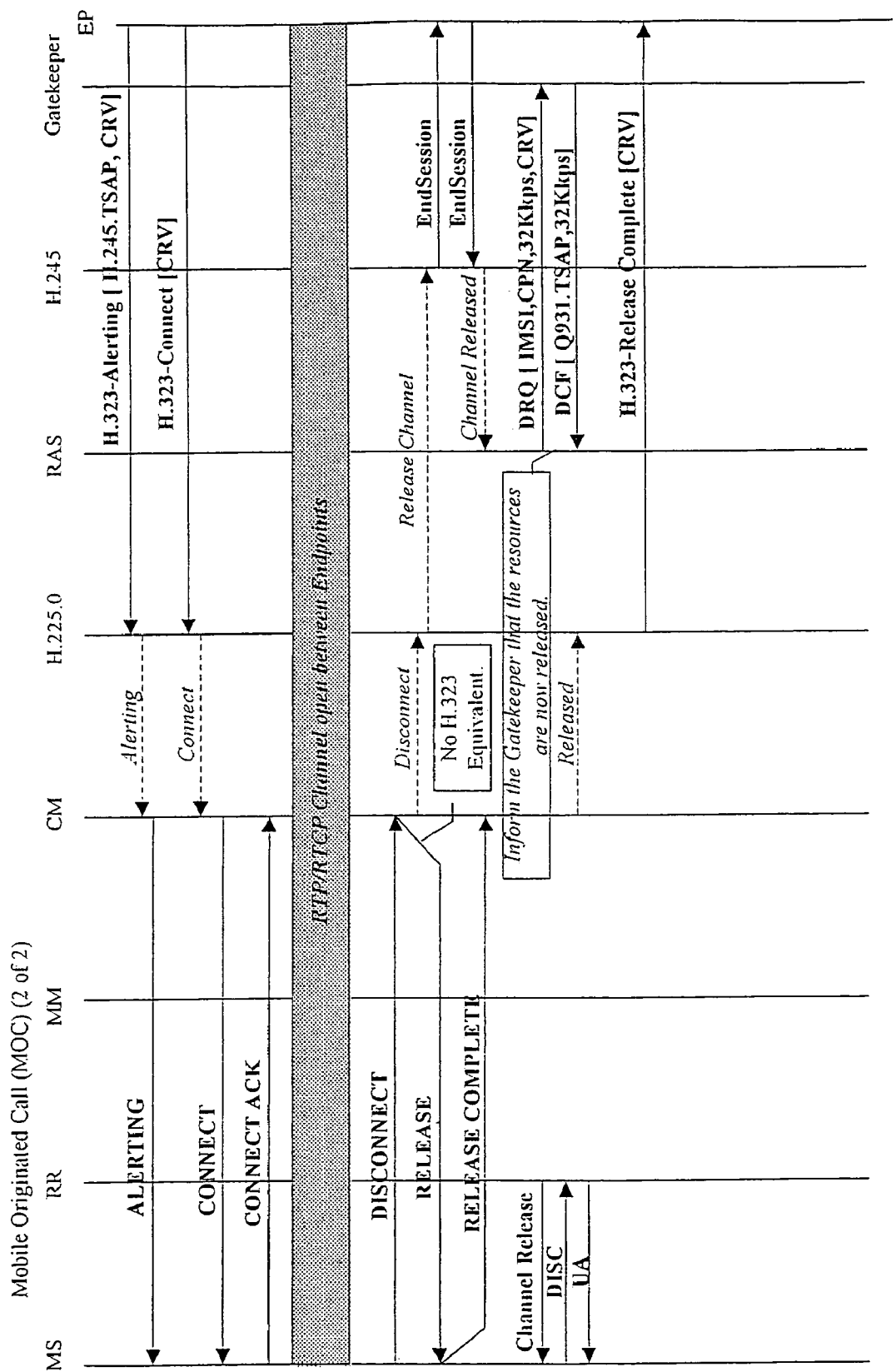
FIG. 11 depicts the second phase of processing a mobile originated call.

Mobile Originated Call—FIG. 10 and FIG. 11

Four variations of the Mobile Originated Call (MOC) need to be considered and these are MOCs which is directed to:
  Private Mobile or Fixed Terminal Located in Private Domain
  Private Mobile in Public Domain
  Public Mobile Located in Private Domain
  Public Mobile or Fixed Terminal Located in Public Domain The Mobile Originated Call (MOC) case is the most difficult in terms of determining the destination of the call and how it is to be routed. The sections below detail how this route determination is to be undertaken.

Mobile Originated Call to Private Mobile or Fixed Terminal Located in Private Domain A Private Mobile User making a Mobile Originated Call would see the call procedure as "identical" to the procedure found in a normal public Wireless Network, the call flow is illustrated in FIG. 10 and FIG. 11. The signalling between the P-BTS and Private wireless gatekeeper function would use the standard H.323 message sequences. The call flows shown in FIG. 10 and FIG. 11 is made up of a number of phases:

Phase 1: This phase is the normal CM Service request made by the mobile station when it wishes to make a Mobile Originated Call. In this case the Mobility Management (MM) layer in the P-BTS will terminate the signalling for this message.

Phase 2: The normal call establishment now continues with the mobile station sending a SETUP message including the Called Party Number (CPN). The Connection Management (CM) layer is responsible for initiating the call into the network.

Phase 3: The CM layer will begin the access process in the H.323 stack by using the RAS Admission Request (ARQ) sequence towards the P-BTS/gatekeeper. The purpose of this sequence is to both locate the terminating party and request LAN bandwidth for use in the call. In a small or isolated network the ARQ sequence may be redundant, however it would permit easy co-existence when the P-BTS resides in more heavily loaded networks, it would also allow the gatekeeper to easily apply QoS procedures to the P-BTS. The ARQ generated by the P-BTS will contain the CPN. The CPN number is used by the gatekeeper to determine the process to be followed in establishing the call. The exact process may be operator specific and is not described in this invention.

The required routing information for the H.323/Q.931 SETUP message can be returned to the serving P-BTS in the ACF message. If the information cannot be resolved or other checks on the originating party fail then the call sequence may be rejected at this point and the call terminated.

Phase 4: Upon receipt of the ACF the serving P-BTS can now route the H.323 SETUP message to the destination. It should be noted that the destination may apply call forwarding or other forwarding operations. As soon as the H.323 Call Proceeding is received the CM layer can proceed with the call processing towards the mobile station.

Phase 5: When the H.323 Call Proceeding message has been received by the H.323 stack establishment of the audio channel can begin. This is undertaken by the Terminal Capabilities, Master/Slave and Bi-Directional Channel Open (B-OpenChn) sequence. This will allow conversation as soon as the mobile station has been assigned to a radio Channel, thereby avoiding any speech clipping problems.

Phase 6: The completion of the call will begin with the sending of a Call Proceeding message to the mobile station. This can then be followed by an assignment of the mobile station to the traffic channel (TCH). The Alerting and Connect sequence are then used to complete the call establishment process.

In establishing this call it has been assumed that the terminating party is either a Private mobile station or Private Fixed Terminal within the same H.323 area. In this case, the Terminal Capabilities negotiation process takes care of selecting the correct code.

In FIG. 10 and FIG. 11, the operation of a Mobile Originated Call to a Private mobile station Located in Public Domain is represented. If the Mobile Originated Call is to another Private mobile station which is now registered on the Public Domain, there are two possible options depending upon how the user data is stored in the network. If the user location data is stored by the Private wireless gatekeeper, then the addresses necessary to route the call will be returned in the ACF, which should point-to the Public MSCNLR serving the Private mobile station. If the user location data is stored in the Public Cellular network HLR then the gatekeeper will either have to request the location data from the Public HLR or simply route the call directly to the gateway then to the nearest MSC. Therefore the routing data for the call will be provided directly by the HLR or indirectly via the MSC. In all of these cases the H.323 SETUP message will be routed to the gateway entity for routing to the external network. In this case it will also be necessary to use the transcoding functions of the gateway entity.

Public Mobile Located in Private Domain

If the Mobile Originated Call is to Public Mobile which is now registered on the Private Domain there are two solutions depending upon how the user data is stored in the network. If the Public user location data is stored by the Private wireless gatekeeper, this pointer is used to "short circuit" the need to interrogate the Public HLR and the addresses necessary to route the call is returned in the ACF, which points to the P-BTS serving the Public mobile station. In this case, the H.323 SETUP message is routed directly to the P-BTS serving the Public mobile station.

If the user location data is stored in the Public HLR, then the Private wireless gatekeeper requests the location data from the Public HLR. This operation provides the routing data for establishing the call via the H.323 gateway. In this case, the gateway is responsible for determining the location of the Public User. Therefore, in practice, the scheme mentioned in the previous paragraph is optimum in terms of signalling performance since the gatekeeper only needs to interrogate the Public HLR if the Public mobile-station cannot be found in the Private Network.

Public Mobile or Fixed Terminal Located in Public Domain

If the Mobile Originated Call is to a Public mobile station or Fixed Terminal located in the Circuit Switched Telephone (CST) domain, then the routing of the call is directly to the gateway. However it may be that in order to speed up the establishment of the call, the Private wireless gatekeeper will search for the CPN on the Private Network first before routing the call to the gateway. The gateway is then responsible for signalling and providing the necessary transcoding functions.

Figure 12:
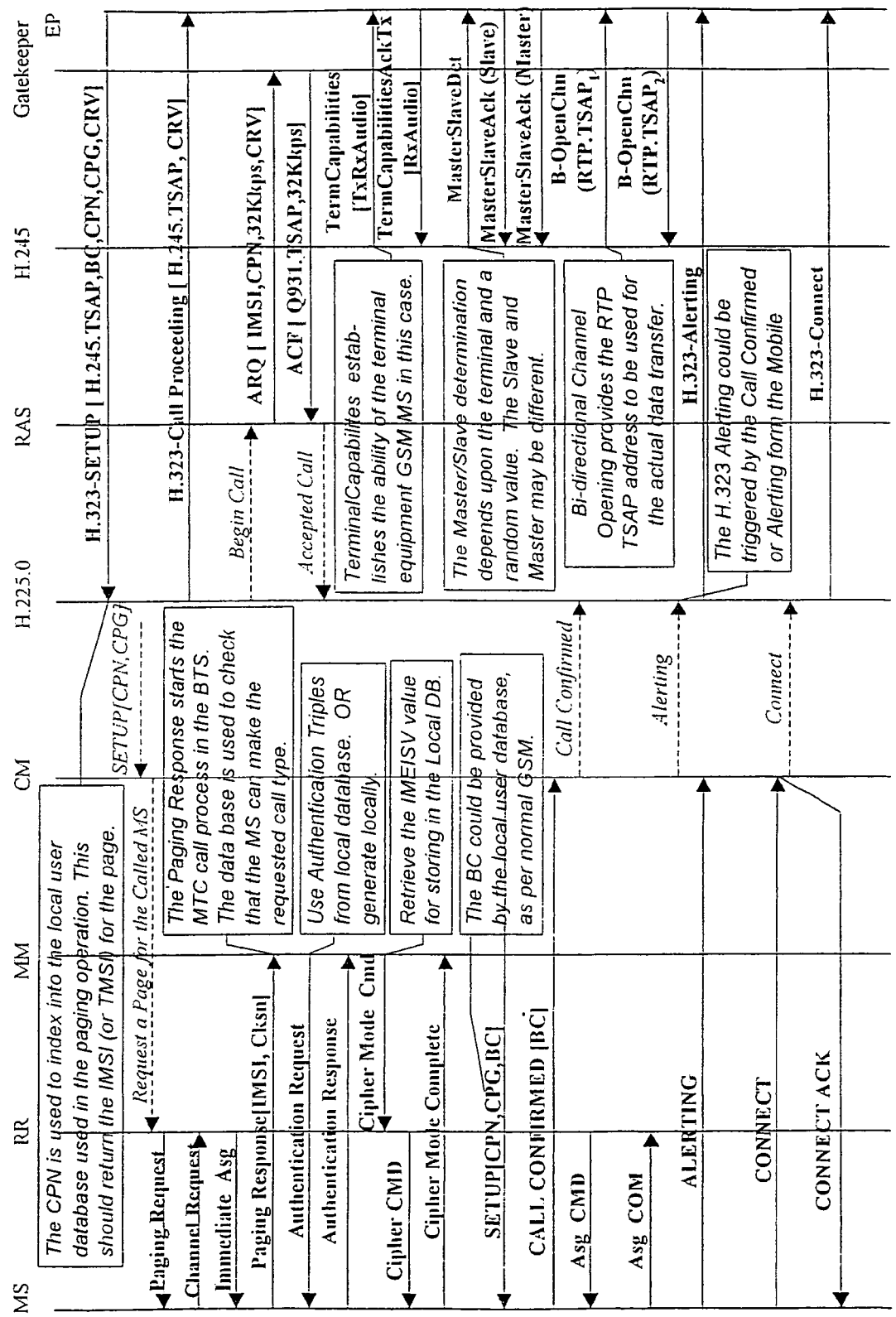
FIG. 12 depicts the first phase of processing a mobile terminated call.
Figure 13:
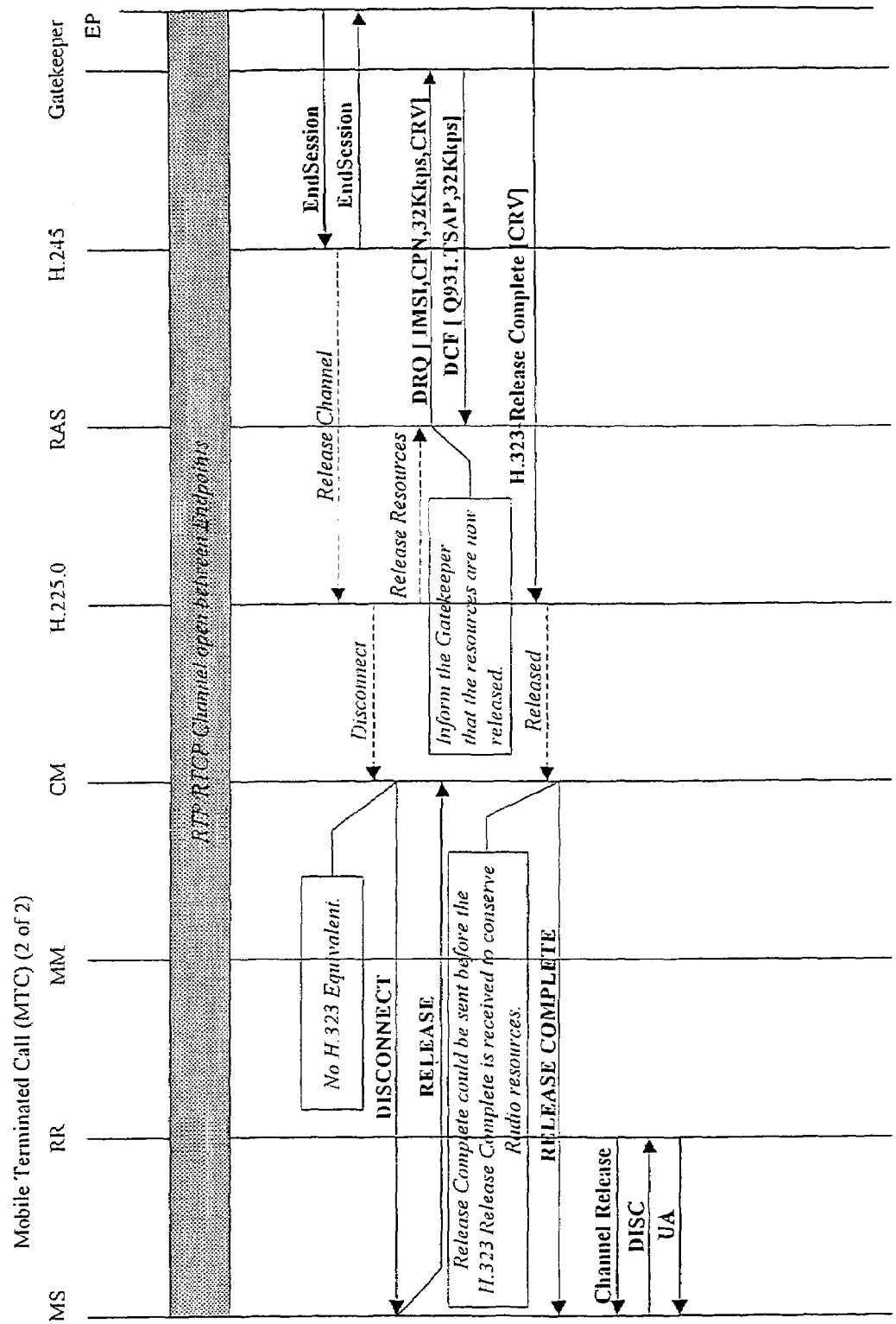
FIG. 13 depicts the second phase of processing a mobile terminated call.

Mobile Terminated Call—FIG. 12 and FIG. 13

The Mobile Terminated Call needs to be performed for four different scenarios:
- Private Mobile or Fixed Terminal Located in Private Domain
- Private Mobile or Fixed Terminal Located in Public Domain
- Public Mobile Located in Private Domain
- Public Mobile or Fixed Terminal Located in Public Domain The Mobile Terminated Call (MTC) case is the most straightforward call scenario. In most of the above cases, the call flows are identical, the only difference being the terminating point and the signalling required to reach that point.

Private Mobile or Fixed Terminal Located in Private Domain to Private Mobile

This case covers two scenarios, calls from another fixed computer terminal using H.323 and calls from another Private mobile station. In both of these cases, the call flows are identical, once the destination address of the Private mobile station has been determined. The call flows shown in FIG. 12 is made up of a number of phases:

Phase 1: The initial phase of a Mobile Terminated Call establishment is started by the arrival of the H.323 SETUP message from the calling party on the well known Q.931 Signaling address in the P-BTS. The CPN number in the SETUP message is then used to lookup up paging information for the Private mobile station. The H.323 Call Proceeding message is returned to the originating endpoint.

Phase 2: The normal Paging request is now made to the mobile station when the Private Network wants to make a Mobile Terminated Call. When the mobile responds to the Page Request the normal Authentication and Ciphering procedures can be performed. During this time it should be possible for the RAS layer to begin the ARQ sequence with the registered gatekeeper in order to reserve the required bandwidth.

Phase 3: The GSM call establishment procedures now continue with the mobile station receiving a SETUP message including the Bearer Capabilities for the call being established, this is required to make sure the mobile station can correctly determine the type of call. For example, an MTC Data call may require a modem to be enabled in the mobile station. When the Call Confirmed message is received from the mobile station then the H.323 stack can then proceed with the LAN part of the call.

Phase 4: When the H.323 stack receives the Call Confirmed message from the mobile station the H.245 layer should begin the necessary Terminal Capabilities, Master/Slave and Bi-Directional Channel Open (B-OpenChn) sequence in order to establish the RTP/RTCP transport link between the endpoints.

Phase 5: In this phase the mobile station can now return the Alerting and Connect messages which are forwarded to the originating endpoint in the Private Network. Upon receipt of the CONNECT message the CM layer can request the assignment of the required radio resources.

In establishing this call it has been assumed that the terminating party is either a Private mobile station or Private Fixed Terminal within the same H.323 area. In this case, the Terminal Capabilities negotiation process takes care of selecting the correct code.

The call release scenario is also given in FIG. 13.

Private Mobile or Fixed Terminal Located in Public Domain

In the case of a Fixed Terminal Circuit Switched Telephone (CST) call to a Private mobile station on the private network, the call is first routed to the nearest H.323 gateway by the PSTN/ISDN network (this may depend on local regulations). The gateway will then be required to interrogate its local Private wireless gatekeeper, which may have to interrogate other gatekeepers, in order to find the required routing information. Once the routing information has been returned, then the call can be established through the Intranet to the terminating P-BTS.

Public Mobile Located in Private Domain

In the case of a Public mobile station located in the Private Network the first requirement is to locate the destination address of the called mobile. This would involve the serving P-BTS interrogating its registered Private wireless gatekeeper to determine the routing address. Once the routing address has been determined the call can be routed to the terminating mobile.

Public Mobile or Fixed Terminal Located in Public Domain

In the case of a Fixed Terminal CST call to a Private mobile station on the private network the call is first routed to the nearest H.323 gateway by the PSTN/ISDN network (this may depend on local regulations). The gateway will then be required to interrogate its local Private wireless gatekeeper, which may have to interrogate other Private wireless gatekeepers, in order to find the required routing information. Once the routing information has been returned then the call can be established through the Intranet to the terminating P-BTS.

Figure 14:
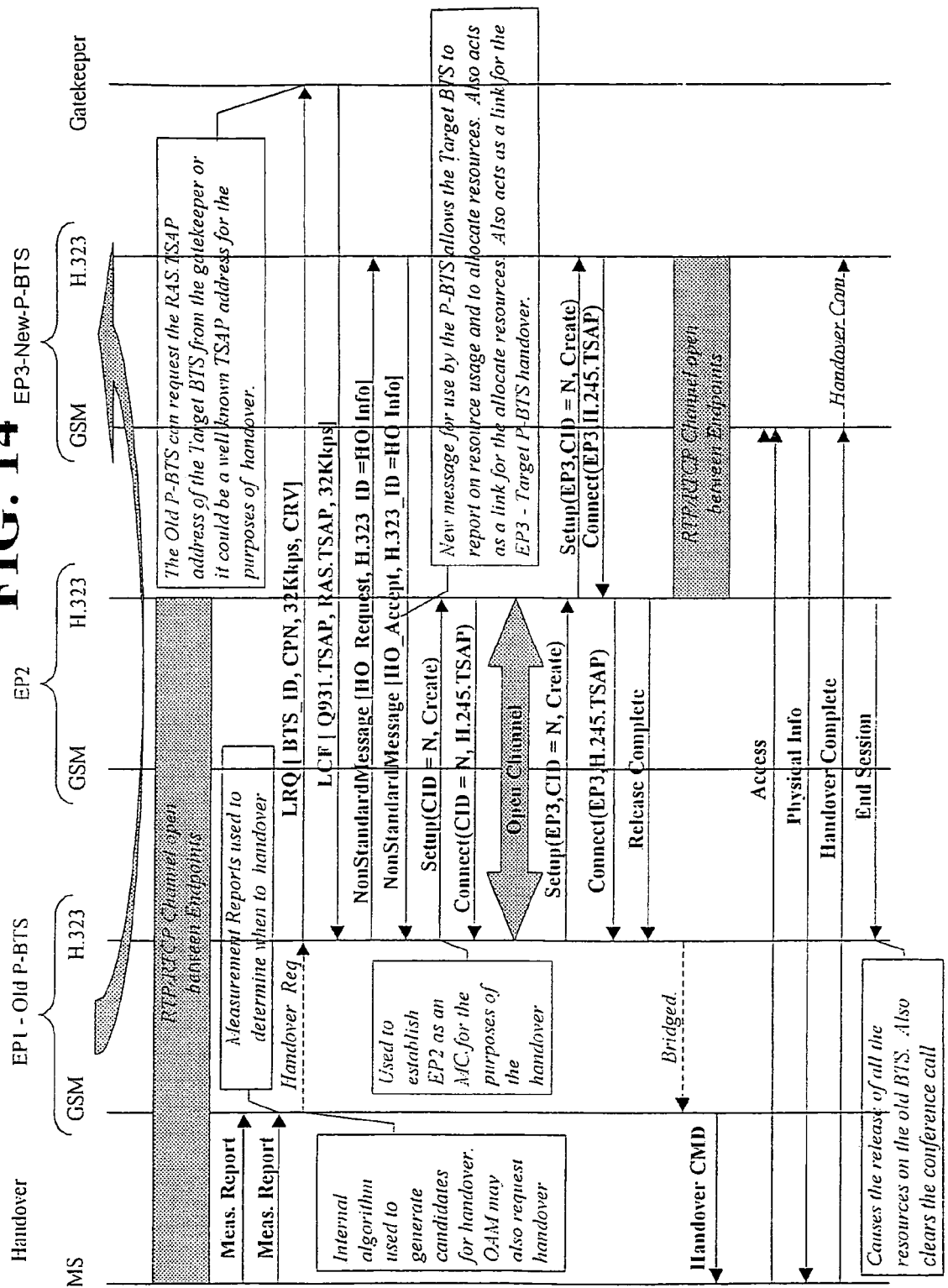
FIG. 14 depicts a handover operation using wireless P-BTS.

Handover Operation With P-BTS—FIG. 14

In FIG. 14 details of a handover operation are shown. The handover scenarios fall into the following categories:
- Intra-Private Network Handover.
- Inter-Private Network Handover
- Private to Public Network Handover
- Public to Private Network Handover The first two cases are dealt with in the next section as they are very similar. The last two cases are not described in detail since they can be built from the first two.

Intra-Private Network Handover Inter-Private Network Handover

In order to provide continuous coverage within the private domain (Intranet), it is necessary to be able to perform at least intra-domain and inter-domain handovers. In order to simplify the implementation of the network, the P-BTS performs the handover candidate calculations on the measurement data being sent by the mobile station. Once a handover candidate has been identified and the decision made, then the process to begin the handover needs to be started. There are several methods used to facilitate the handover process. The simplest solution is to use the conference facilities of H.323 and the resources of the gatekeeper/Multi-Conference Unit (MCU) to bridge the old P-BTS and the target P-BTS. Another method uses the multicast options of the Intranet to send the uplink and downlink IP packets to both the old and new P-BTSs. In either case, the target P-BTS enables the new radio interface, prepares to take over the mobile station Call Control state machine and establishes the necessary routing to access the network.

Once the new radio channel has been established, the terminal is instructed to move to the new P-BTS and the old P-BTS resources are released. If each P-BTS used a different LAI, then location updating (registration) is automatically performed when the call terminates. In performing the handover as shown in FIG. 14, the following phases are undertaken:

Phase 1: Once the handover algorithm has determined that a handover is required then the transport addresses of the new base station must be determined. The new base station address is determined by making use of the RAS Location Request with the BTS ID as the addressed party. When appropriate this operation is extended to include the locations of BTSs within the Public GSM network.

Phase 2: If the gatekeeper knows the transport addresses of the Target BTS (EP3) then it is returned in the Location Confirm (LCF) message. At this point the Old BTS (EP 1) must request the resources from the Target BTS. The resource request is performed by adding a new "Non-Standard Message" to the H.323 repertoire. This new message requests the resources from the Target BTS. This message may also include call control information appropriate to this mobile station. In addition, to speed up the location updating process, it may also include the Old BTSs copy of the user data.

In the case of a handover to the Public network then the "Non-Standard Message" would have to be sent to the gateway and converted into the appropriate Handover message for the public network.

The gateway would also have to start handling the call for the Old BTS.

Phase 3: When the Target BTS receives the request for the resources, if they are available then it will respond with a confirmation and a multicast address to be used by the Old BTS.

Phase 4: Upon receiving the confirmation the Old BTS begins to establish a conference between the destination BTS (EP2) or Fixed Terminal and the Target BTS. Once the multicast distributed conference has been established the Old BTS can instruct the mobile station to handover to the Target BTS.

Phase 5: The Handover Command is sent to the mobile station which will then begin to access the Target BTS on the indicated timeslot, Once the mobile station is established on the Target BTS an End Session message is sent to the Old BTS to release the resources from the BTS. The Call Control is now located on the Target BTS.

In order to accommodate different handover cases, the P-BTS determines via the BTS ID whether Synchronized or Non-synchronized handover is to be used.

It should be noted that this procedure is equally applicable to both Private and Public mobile stations. This procedure also forms the basis for any scheme which requires handover to/from the Public GSM network.

Figure 15:
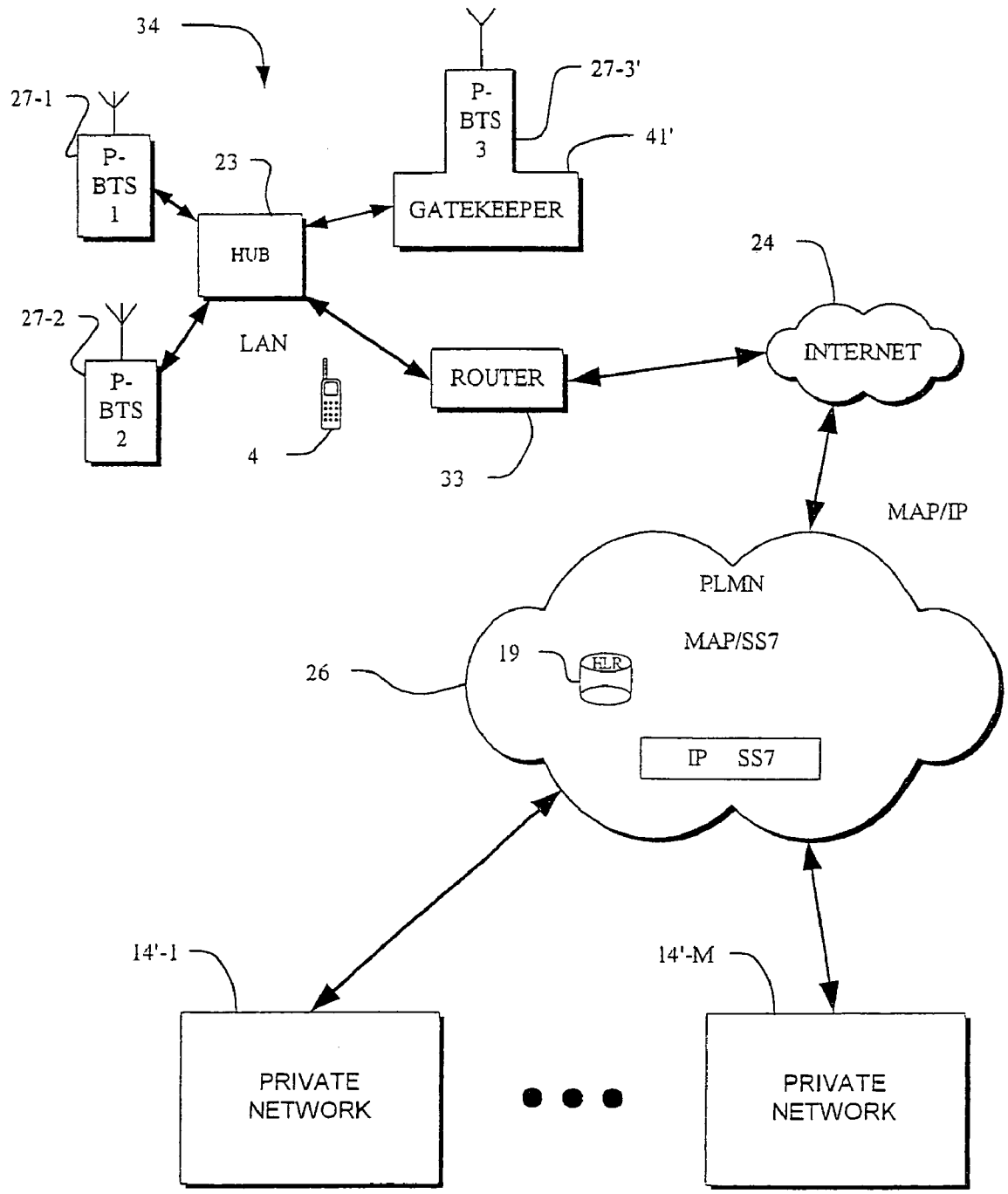
FIG. 15 depicts an Virtual Private Network (VPN) interconnection to GSM Public Land Mobile Network.

VPN Interconnection To GSM PLMN—FIG. 15

In FIG. 15, a P-BTS Virtual Private Network (VPN) 34 formed by the P-BTSs 27-1, 27-2 and 27-3' interconnects to GSM PLMN 26 through hub 23 and router 33 to the Internet 24. In FIG. 15, the wireless gatekeeper 41' is part of the P-BTS 3 27-3'. The gatekeeper 41' communicates with the Public Cellular HLR 19 using a reduced form of the normal Public Wireless Cellular Signaling system. The HLR 19 can then be contacted using the Internet over a dedicated trunk line from a gateway. The trunk lines connect the H.323 gateway to the MSC and then to the HLR 19. At the HLR 19, an IP SS7 translator is used, to convert the incoming control signalling riding on IP to be sent over SS7 and vice-versa. In order to efficiently support private/public roaming, the IP to SS7 translation entity is best co-located with the Public Cellular Network HLR 19, where it can be used to service many private networks such as networks 14'-1, ..., 14'-M as well as private network 14-1 in FIG. 15. Using this scheme, Public-to-Private and Private-to-Public roaming is easily performed. The IP/SS7 translator is available from many manufacturers. This function is also used to transport Short Messages to and from the Private/Public domain.

The support of handover is achieved with the addition of handover support in the gateway entity and an IP-to-SS7 convertor co-located with the nearest MSC. This addition allows handover, messages to be passed to and from the MSC, via the H.323 gateway and then to the serving P-BTS.

While the invention has been particularly shown and described with reference to preferred embodiments thereof it will be understood by those skilled in the art that various changes in form and details may be made therein without departing from the scope of the invention. Some terms used in the specification are set forth in the following GLOSSARY.

GLOSSARY

ALS Alternate Lines Selection
ARS Automatic Route Selection
CAR Call Detail Record
CC Call Control
DHCP Dynamic Host Configuration Protocol
DNS Domain Name Server
GoIP GSM over IP
GSM Global System for Mobile Communications
HTML Hyper Text Markup Language
IMEI International Mobile Equipment Identity
IMSI International Mobile Subscriber Identity (based on E.212 numbering)
IrDA Infra red Digital Access
ISDN Integrated Services Digital Network
Java Programming language from Sun MicroSystems
LAI Location Area Identifier
LCR Least Cost Routing
MIB Management Information Base
MM Mobility Management
MS Mobile station
MSIDN Mobile station ISDN Number
NNTP Network Time Protocol
OAM Operations, Administration & Maintenance
PDA Personal Digital Assistant
PLMN Public Land Mobile Network
RR Radio Resource
SMS-CB Short Message Service—Cell Broadcast
SMS-PP Short Message Service—Point-to-Point
SNMP Simple Network Management Protocol
SNTP Simple Network Time Protocol
TMSI Temporary Mobile Subscriber Identity VPN Virtual Private Network

What is claimed is:

1. A method for operating a private base transceiver station, the private base transceiver station having at least one radio transceiver that communicates data and signaling information with a mobile station, the private base transceiver station also having a mobility management processing function and a call control processing function contained within it, the private base transceiver station also having an interface for connecting to a packet data network, the method comprising the steps of:
   receiving a call control message at the private base transceiver station and passing the call control message to the mobility management processing function resident within the private base transceiver station, without forwarding the call control message elsewhere, the call control message including a control function identifier and a mobile station identifier;
   forwarding the call control message internally within the private base transceiver station to a packet network interface in the private base transceiver station, the packet network interface providing an interface for the private base transceiver station to communicate messages to other nodes; and
   at the packet network interface, formatting an external control message intended for transmission via the packet network interface.

2. A method as in claim 1 wherein the call control message is of a type requesting a location update and the method additionally comprises:
   reformatting the call control message as a registration request message at the packet network interface function, the registration request message specifying the mobile station identifier;
   transmitting the registration request message to the packet network interface; and
   receiving a confirmation message from the packet network interface, the confirmation message including a packet data network identifier for the mobile station.

3. A method as in claim 2 additionally comprising:
   before the step of transmitting the registration request message, receiving a channel request message at the radio transceiver from the mobile station;
   forwarding the channel request message to a radio resource function also resident within the private base transceiver station;
   formatting an immediate channel assignment message within the radio resource function; and
   forwarding the immediate channel assignment message to the radio transceiver for transmission to the mobile station.

4. A method as in claim 3 additionally comprising:
   receiving a message confirming acknowledgment from the packet data network interface, the message indicating call parameters.

5. A method as in claim 1 additionally establishing a connection for a mobile station initiated call, comprising the steps of:
   receiving a call setup message from the mobile station at the transceiver within the private base transceiver station;
   forwarding the call setup message to the mobility management function within the private base transceiver station, the call setup message indicating a called party number;
   formatting an internal setup message in a connection management function within the private base transceiver station the call setup message indicating a called party number;
   formatting an internal setup message in a connection management function within the private base transceiver station;
   forwarding the internal setup message to the packet network interface function;
   formatting a message requesting acknowledgment of the internal setup message; and
   formatting a message requesting acknowledgment of the internal setup message; and
   forwarding the message requesting acknowledgment to the packet data network interface.

6. A method as in claim 5 additionally comprising:
   sending a setup message from the private base transceiver station to the packet data network interface, the setup message including an indicator of the called party number to be used by the mobile station;
   in response thereto, receiving at the packet data network interface, a call proceeding message;
   forwarding the call proceeding message internally to the connection management function within the private base transceiver station; and
   forwarding a call proceeding message from the connection management function to the mobility managemen function.

7. A method as in claim 1 additionally comprising functions for terminating a call further comprising the steps of:
   receiving, from the packet data network interface, a setup message encapsulated in a data network message;
   forwarding the setup message through an internal protocol stack as an internal setup message indicating a called party number and other configuration information to the connection management function in the private base transceiver station; and
   sending an internal page request message from the connection management function to the radio resource function within the private base transceiver station.

8. A method as in claim 7 additionally comprising:
   issuing, from the radio resource function, a paging request message; transmitting the paging request message, via the transceiver, to the mobile station;
   in response thereto, receiving a paging response message at the transceiver, the paging response message indicating a mobile station identifier;
   forwarding the paging response message to the mobility management function, to initiate a begin call sequence.

9. A method as in claim 8 additionally comprising:
   after the call setup message is received at the connection management function, forwarding a begin call internal message from the connection management function to the packet interface function, the begin call message initiating a message requesting acknowledgment that includes the mobile station identifier and called party number;
   receiving, from the packet data network interface, a message confirming acknowledgment indicating connection information; and
   generating an internal accepted call message using the received message confirming acknowledgment, to establish an ability to receive a call.

10. A method as in claim 9 additionally comprising:
    in response to receiving the accepted call message at the connection management function, transmitting, via the transceiver, a setup message to the mobile station, the setup message indicating a called party number and channel number;

receiving, at the transceiver, a call confirmed message from the mobile station; forwarding the call confirmed message to the connection management function;

generating an internal call confirmed message in the connection management function;

forwarding the internal call confirmed message to the packet network interface; and transmitting an open channel message from the packet layer interface.

11. A method as in claim 1 wherein the call control messages indicate a handover of servicing the mobile station from a serving private base transceiver station to a target private base transceiver station, further comprising:

passing a handover request message from the connection management function within the private base transceiver station to the packet network interface;

generating a location request message indicating the private base transceiver station identifier and called party number;

transmitting the location request message to the packet network interface; and receiving at packet network interface, a location confirmation message indicating handover processing information.

12. A method as in claim 11 additionally comprising:

forwarding a handover message over the packet network interface as a nonstandard packet data network message indicating a handover request; and receiving, at the packet network interface, a handover acceptance message as a nonstandard packet data network message.

13. A method as in claim 12 additionally comprising:

upon receipt of a connection message at the packet network interface, the connection message received from the target private base transceiver station and reporting an allocation of resources, bridging a release complete message received from the target private base transceiver station at the serving private base transceiver station from the packet layer interface to the layer for connection management;

bridging the release complete message from the layer for connection management to the processing layer for mobility management; and forwarding a handover command from the processing layer for mobility management to the mobile station.

14. The method of claim 1 wherein the external control messages causes a protocol address of the private base transceiver station associated with the mobile station identified by the mobile station identifier to be changed to a different protocol address of a different private base transceiver station.

15. A computer readable storage medium encoded with a computer program for operating a private base transceiver station, the private base transceiver station having radio transceivers that communicate data and signaling information with a mobile station, the private base transceiver station also having a mobility management function and a call control function contained within, the private base transceiver station also being connected to a packet data network, comprising:

an encoded computer program for receiving a call control message at the private base transceiver station and passing the call control message to the mobility management function resident within the private base transceiver station, without forwarding the call control message to a base station controller, the call control message including a control function identifier and a mobile station identifier;

an encoded computer program for forwarding the call control message internally within the private base transceiver station to a packet interface function in the private base transceiver station, the packet interface function for connecting the private base transceiver station to the packet data network;

an encoded computer program for formatting an external control message intended for transmission over the packet data network, the formatted external control message indicating an alias identifier corresponding to the mobile station identifier; and an encoded computer program for transmitting the external control message into the packet data network.

16. The computer readable storage medium of claim 15 wherein the external control message causes a protocol address of the private base transceiver station associated with the mobile station identified by the mobile station identifier to be changed to a different protocol address of a different private base transceiver station.

17. A private base transceiver station having a radio transceiver function that communicates data and signaling information with a mobile station, the private base transceiver station also having a mobility management function and a call control processing function contained within the private base transceiver station also having a packet network interface for connecting to a packet data network, the private base transceiver station further comprising:

a transceiver operable to receive a call control message and to pass the call control message to the mobility management function resident within the private base transceiver station, without forwarding the call control message to a base station controller, the call control message including a control function identifier and a mobile station identifier;

a packet network interface layer operable to receive the forwarded call control message internally within the private base transceiver station, the packet network interface layer further operable to provide communication between the private base transceiver station and other nodes; and a processor within the private base transceiver station, for formatting an external control message intended for transmission over the packet data network, the formatted external control message indicating an alias identifier corresponding to the mobile station identifier.

18. The private base transceiver station of claim 17 wherein the external control message causes a protocol address of the private base transceiver station associated with the mobile station identified by the mobile station identifier to be changed to a different protocol address of a different private base transceiver station.

19. A private base transceiver station, having a radio transceiver that communicates data and signaling information with a mobile station, the private base transceiver station also having a mobility management function and a call control function contained within it, the private base transceiver station further connected to a packet data network, comprising:

means for receiving a call control message at the private base transceiver station and for passing the call control message to the mobility management function resident within the private base transceiver station, without forwarding the call control message to a base station controller, the call control message including a control function identifier and a mobile station identifier;

means for forwarding the call control message internally within the private base transceiver station to a packet network interface in the private base transceiver station, the packet network interface operable to provide communication between the private base transceiver station and the packet data network;

means for, formatting an external control message intended for transmission over the packet data network, the formatted external control message indicating an alias identifier corresponding to the mobile station identifier; and interface means, for connecting to the packet data network and transmitting the external control message into the packet data network.

20. The wireless communication system of claim 19 wherein the external control message causes a protocol address of the private base transceiver station associated with the mobile station identified by the mobile station identifier to be changed to a different protocol address of a different private base transceiver station.

\* \* \* \* \*